(12) United States Patent
Minobe et al.

(10) Patent No.: US 7,884,976 B2
(45) Date of Patent: Feb. 8, 2011

(54) IMAGE SENSING APPARATUS

(75) Inventors: Tadashi Minobe, Tokyo (JP); Hiroyuki Kawano, Tokyo (JP); Izumi Mikami, Tokyo (JP); Takafumi Endo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 280 days.

(21) Appl. No.: 12/261,520

(22) Filed: Oct. 30, 2008

(65) Prior Publication Data

US 2009/0147321 A1 Jun. 11, 2009

(30) Foreign Application Priority Data

Dec. 6, 2007 (JP) ............................. 2007-316087

(51) Int. Cl.
*H04N 1/04* (2006.01)
*H04N 1/46* (2006.01)

(52) U.S. Cl. ..................... 358/483; 358/482; 358/475; 358/497; 358/474; 358/514; 358/512; 358/509; 358/505; 250/208.1

(58) Field of Classification Search ................ 358/483, 358/482, 475, 497, 494, 474, 484, 512–514, 358/509, 505; 250/208.1, 239, 234–236, 250/216; 359/212.1, 850, 857, 858, 859, 359/861–864, 605, 556; 382/312, 318, 319; 399/211

See application file for complete search history.

(56) References Cited

U.S. PATENT DOCUMENTS

| 5,489,992 A | 2/1996 | Endo |
| 5,617,131 A * | 4/1997 | Murano et al. .............. 347/233 |

(Continued)

FOREIGN PATENT DOCUMENTS

CN 1155218 C 6/2004

(Continued)

*Primary Examiner*—Cheukfan Lee
(74) *Attorney, Agent, or Firm*—Oblon, Spivak, McClelland, Maier & Neustadt, L.L.P.

(57) ABSTRACT

An image sensing apparatus having a large depth of focus (DOF) and being compact in size is provided. The image sensing apparatus includes a plurality of light sources that shines light beams on an illumination portion of a document; a first mirror that receives incident light scattered by reflection from the document, to reflect the scattered light in the secondary scan direction; a plurality of first concaved aspheric mirrors that collimates light beams from the first mirror, to reflect therefrom the collimated light beams as substantially collimated light fluxes; an aperture mirror that reflects therefrom the light beams from the respective first aspheric mirrors, through apertures each having a light-shielded portion formed therearound and selectively passing the light beams therethrough; a plurality of second concaved aspheric mirrors that receives the light beams incident from the respective aperture mirror, to reflect the incident light beams as converging light beams; a second mirror that reflects the light beams in a direction perpendicular to the surface of the document, disposed on a path of the light beams to be converged by means of the second aspheric mirrors; a plurality of light receivers each having a light-receiving area that receives the light beams from the second mirrors, to form images according to the light beams from the respective apertures; and a casing where the first and second aspheric mirrors are disposed on a first side of the casing in the secondary scan direction, and the aperture mirror is disposed on a second side thereof in the secondary scan direction.

16 Claims, 25 Drawing Sheets

U.S. PATENT DOCUMENTS

| | | | |
|---|---|---|---|
| 7,242,502 B2 * | 7/2007 | Huang et al. | 358/475 |
| 7,385,733 B2 * | 6/2008 | Sunaga | 358/471 |
| 2003/0030923 A1 * | 2/2003 | Hsu et al. | 359/857 |
| 2003/0164995 A1 * | 9/2003 | Hsu et al. | 358/509 |
| 2004/0057097 A1 * | 3/2004 | Huang et al. | 359/212 |
| 2005/0002317 A1 * | 1/2005 | Hakamata | 369/121 |
| 2005/0179962 A1 * | 8/2005 | Williamson | 358/473 |

FOREIGN PATENT DOCUMENTS

| | | |
|---|---|---|
| JP | 5-328024 | 12/1993 |
| JP | 8-28966 | 2/1996 |
| JP | 11-8742 | 1/1999 |
| JP | 2003-331267 | 11/2003 |
| JP | 2006-259544 | 9/2006 |

* cited by examiner

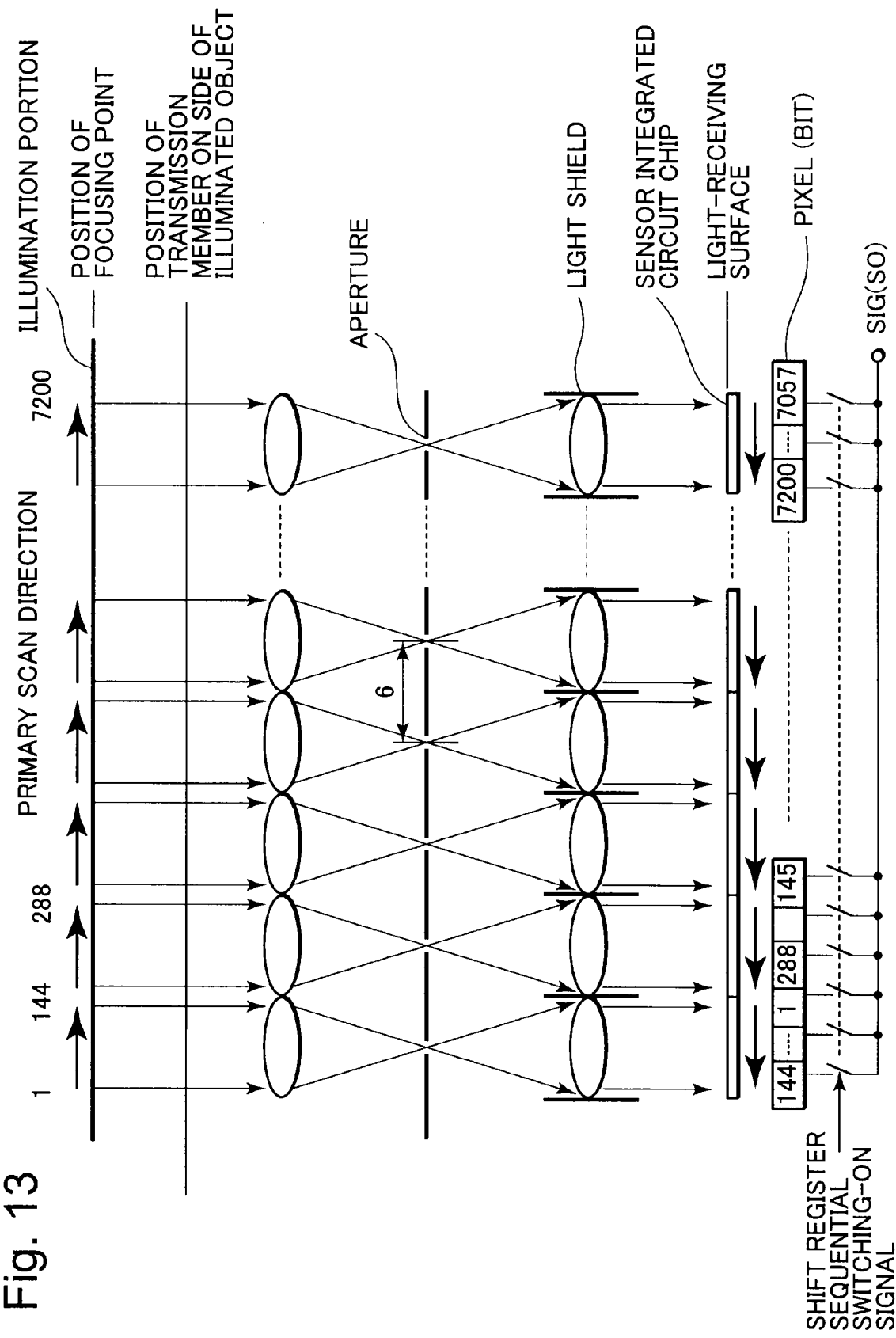

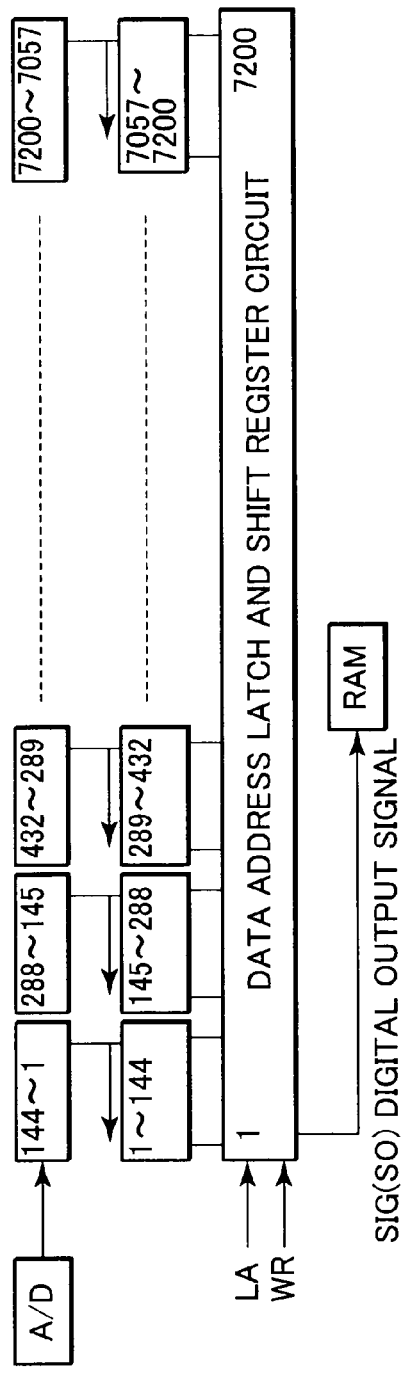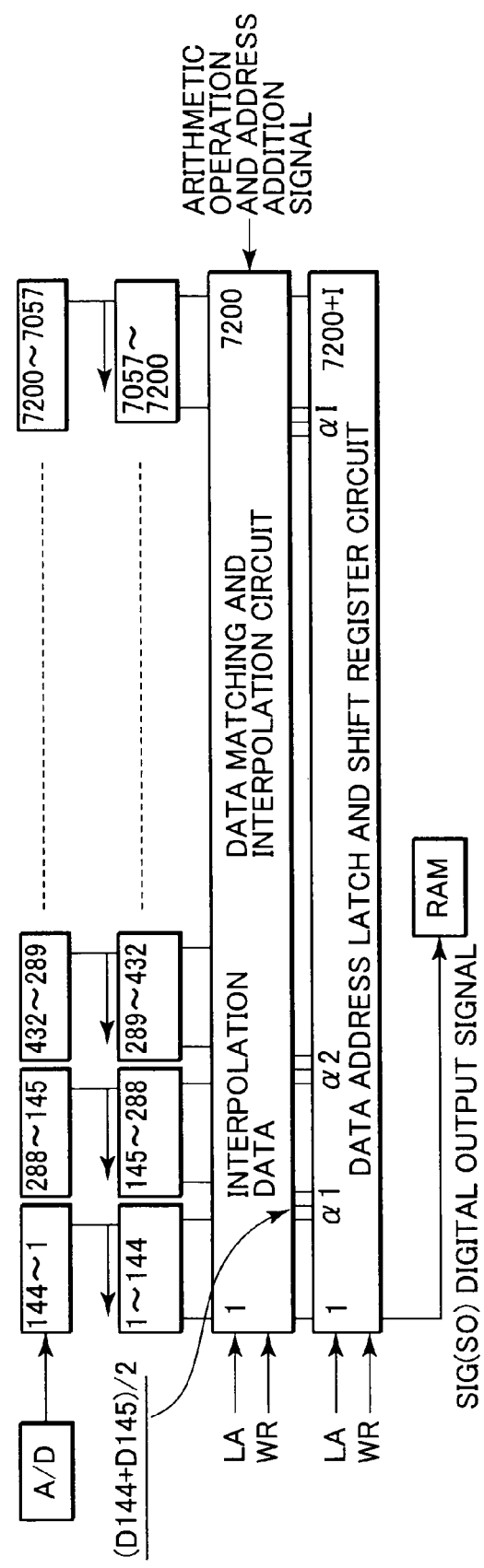

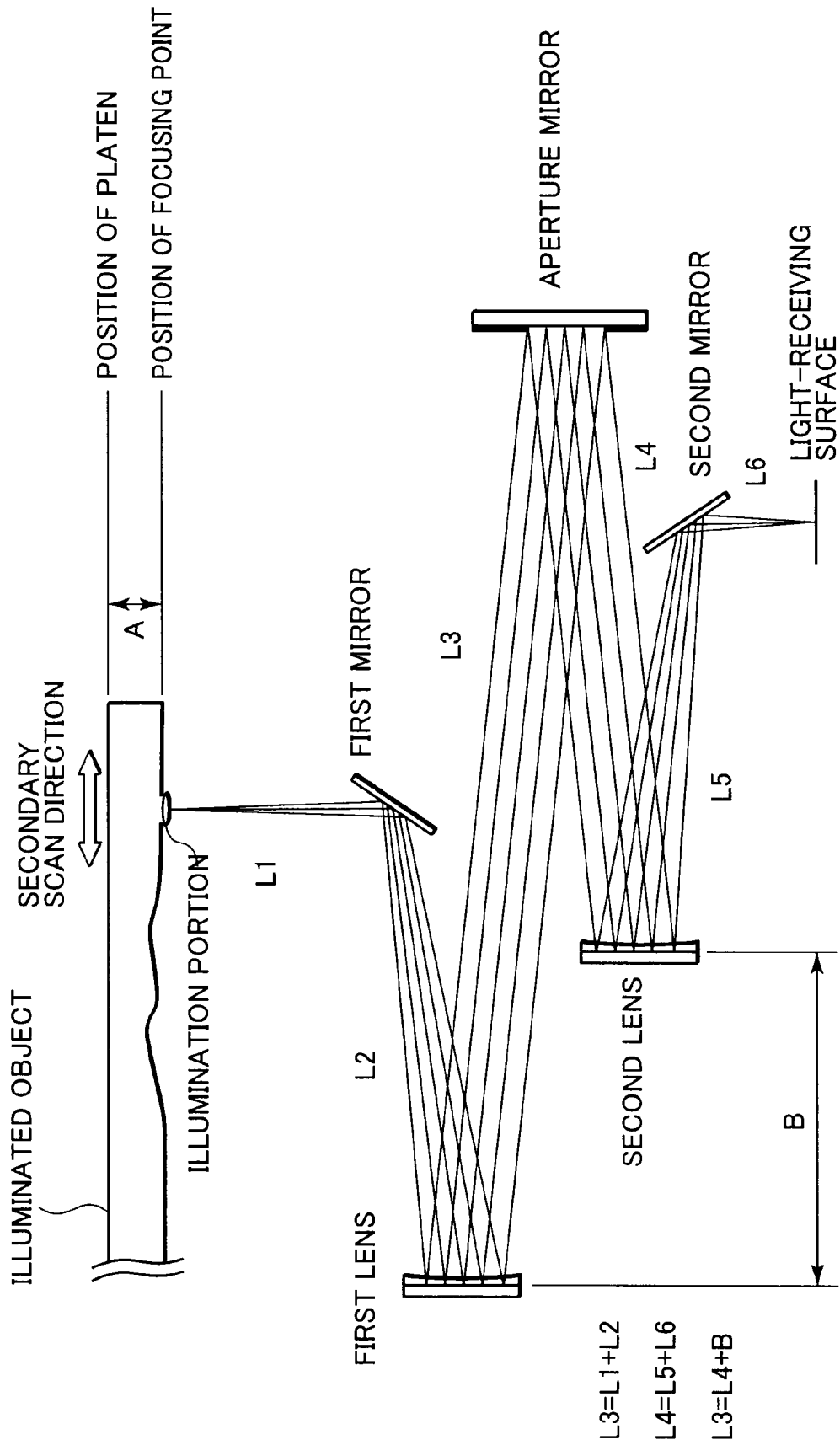

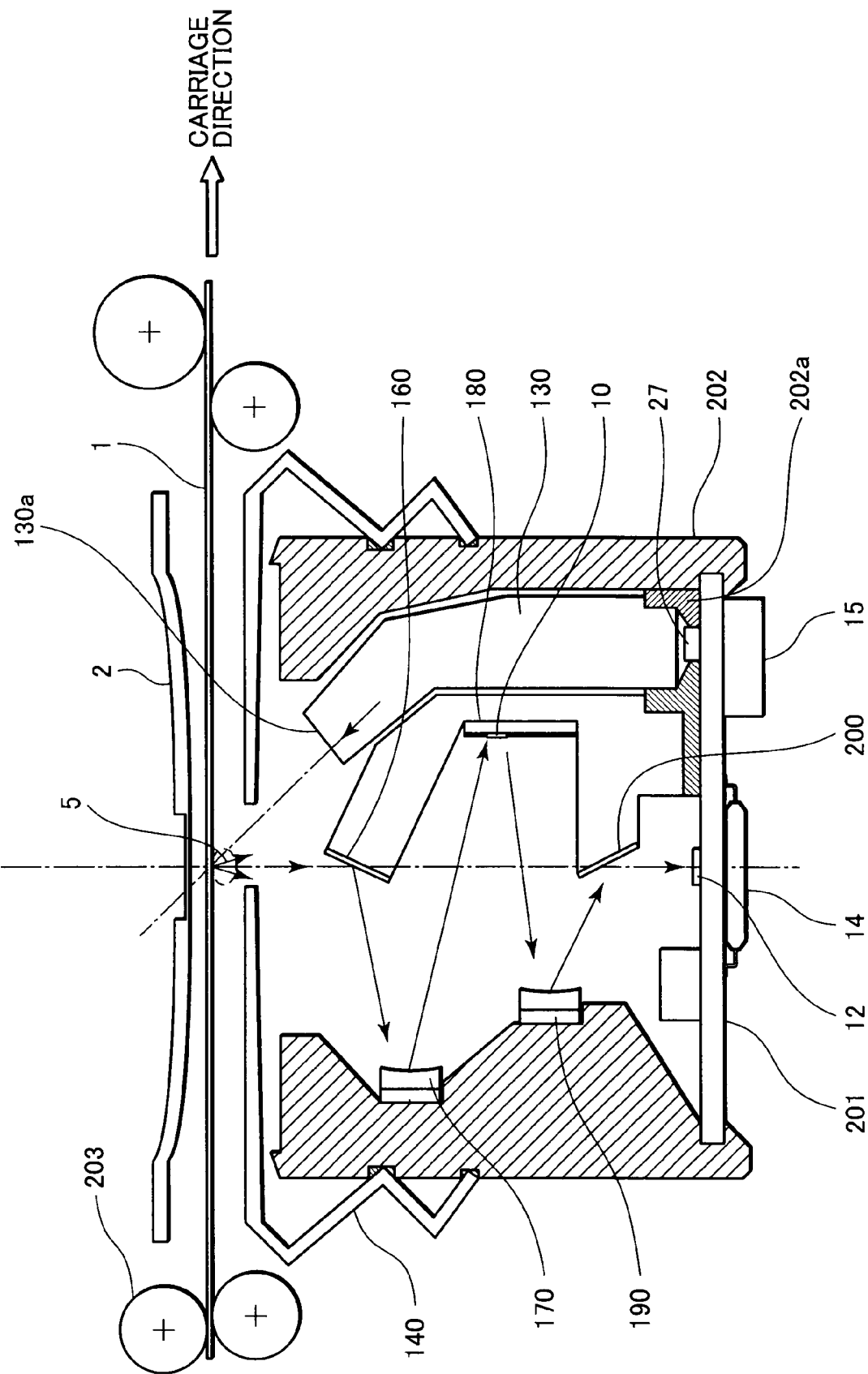

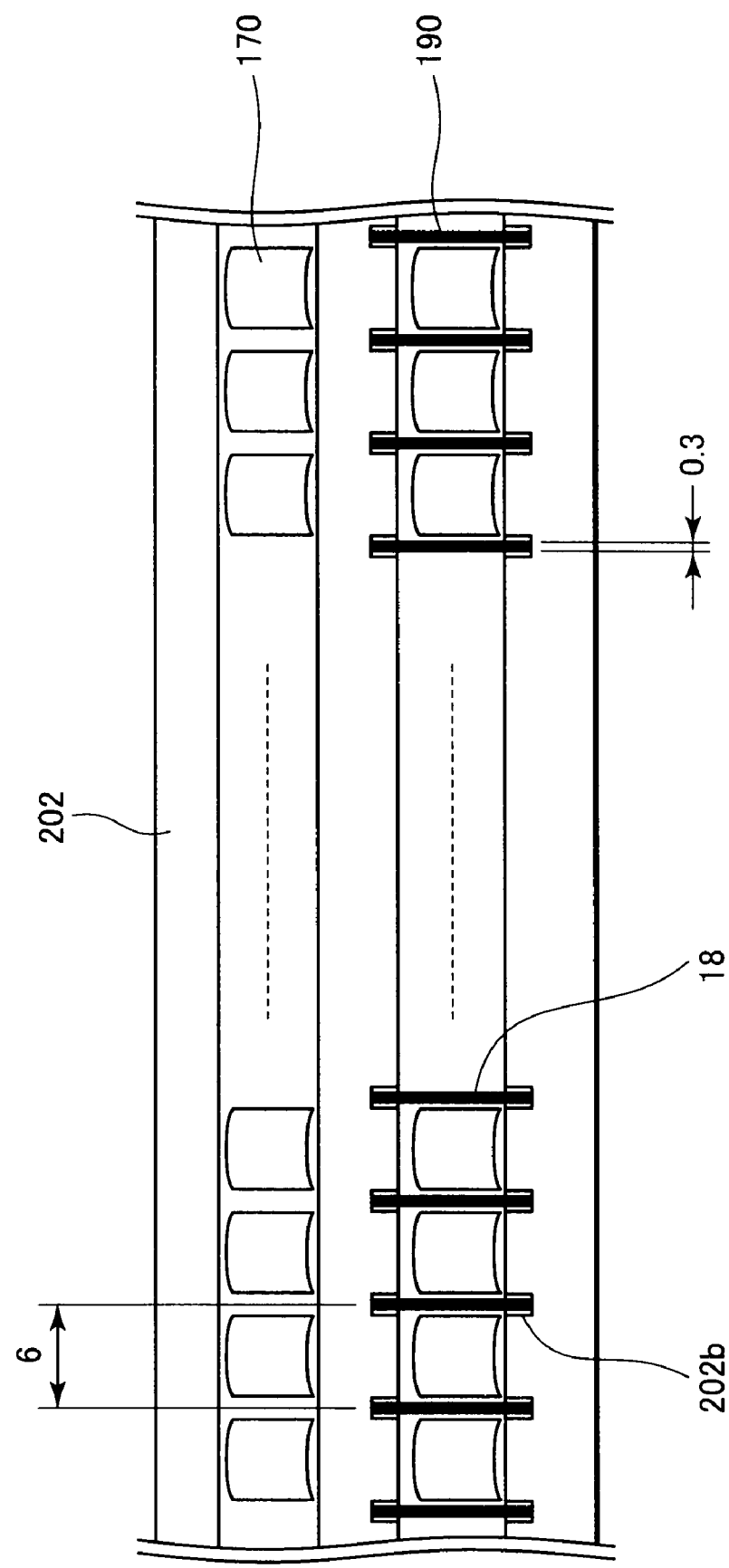

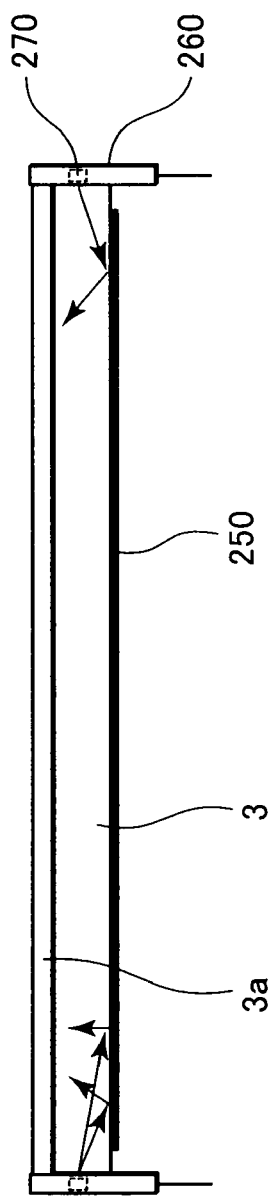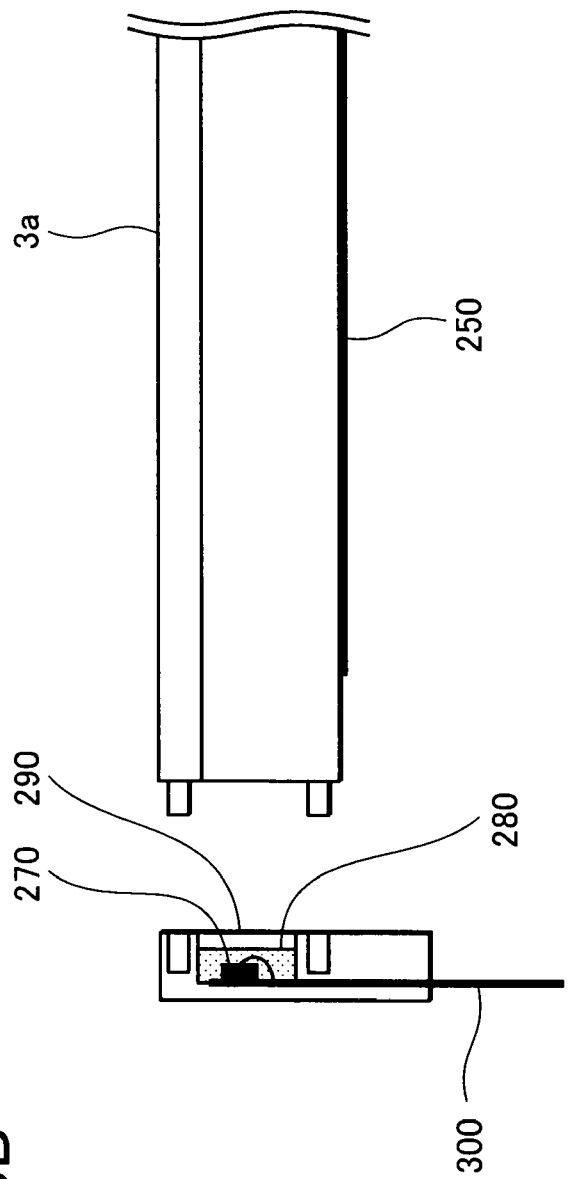
Fig. 23A
Fig. 23B

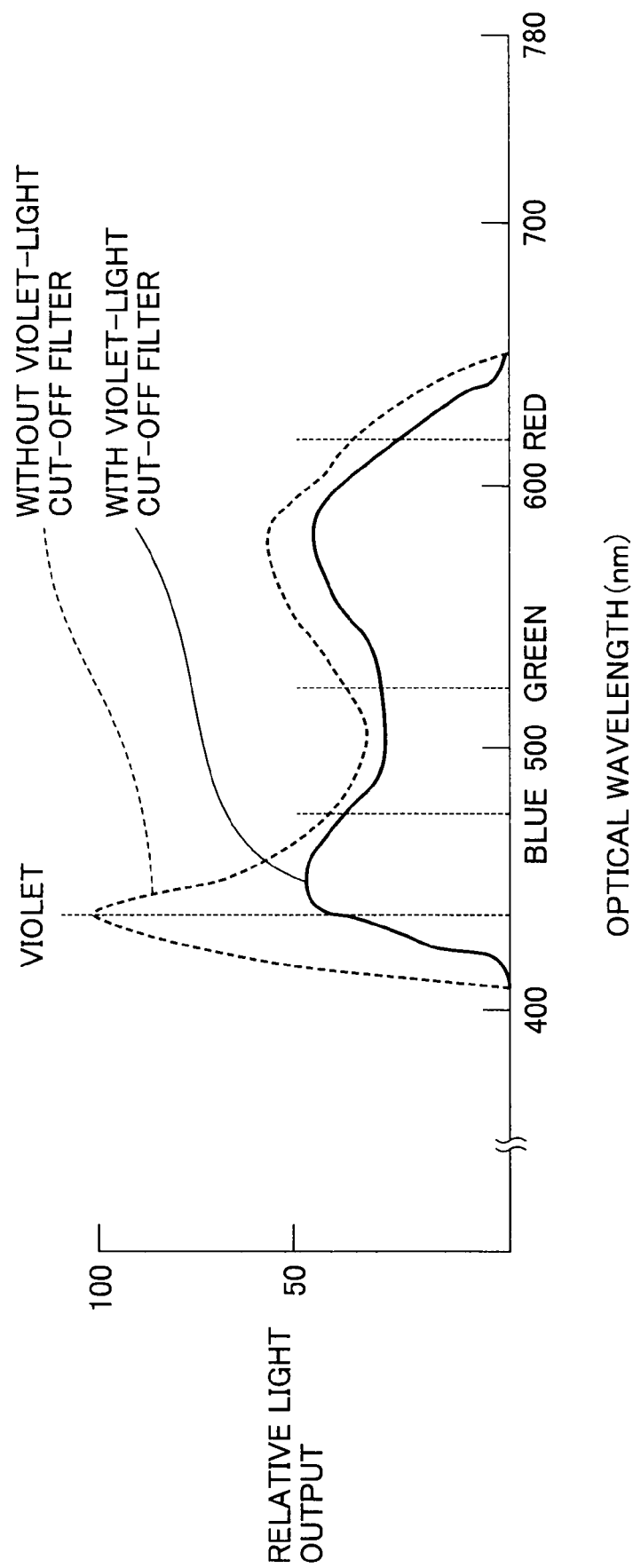

IMAGE SENSING APPARATUS

FIELD OF THE INVENTION

The present invention relates to image sensing apparatuses that are used for image sensing or identification devices such as photocopiers or financial terminals, respectively.

BACKGROUND OF THE INVENTION

For example, Japanese Unexamined Patent Publication H11-8742 (FIG. 2) discloses a sensing apparatus that utilizes a mirror array, as an image sensing apparatus that senses image information.

In addition, Japanese Unexamined Patent Publication 2003-331267 (see FIG. 2) discloses an image sensing device having a telecentric optical system and an illumination system that are suited to test on one-time primary scanning of a plurality of testing portions being present on a mounting substrate.

Furthermore, Japanese Unexamined Patent Publication H5-328024 discloses that an image sensing apparatus includes a light source lamp 24 that shines light beams on a sensing object G; optical means 20 and 30 for transmitting light beams reflected by the sensing object G; an optical element 44 for dividing the light beams from the optical means 20 and 30, into a plurality of light fluxes each spaced apart a predetermined distance; and a plurality of detectors 46r, 46g and 46b provided with different color filters, at a position where each of the light beams divided by the optical element 44 is received.

In the image sensing apparatus as set forth in Japanese Unexamined Patent Publication H11-8742, the mirror array in an optical path from a document 10 to a photo-sensor array 15 is configured to determine inclination of the optical axis of a first and a second mirror array so that an axis perpendicular to the sensing surface of a document sensing section may be in parallel with an axis perpendicular to a light-receiving surface of the photosensor array; however, no detailed description is disclosed regarding the mirror array's specific location and the optical axis inclination.

The image sensing apparatus as set forth in Japanese Unexamined Patent Publication 2003-331267, including an epi-illumination light source 1 and a side-illumination light source 4, are constituted by a first lens 9 composed of a cylindrical lens and a second lens 7 of the image-taking system; and the first lens 9 is located within 50 mm apart from the test substrate, and the posterior focal point of the first lens 9 is made to coincide with the incident pupil position of the second lens 7, thereby achieving a compact and telecentric optical system; however, no detailed description is disclosed regarding their specific locations and a scan method.

Furthermore, a problem has been that in the apparatus as disclosed in Japanese Unexamined Patent Publication H5-328024, there is a need for a focusing optical element 42 that makes variable a focusing distance for converting red-blue-green (RGB) image information into electrical signals using a three-line CCD (charge-coupled device) sensor array 46, thus resulting in a complex configuration.

The present invention is directed to overcome the foregoing issues, and an object of the present invention is to provide an image sensing apparatus having a large depth of focus and being compact in size.

SUMMARY OF THE INVENTION

In one aspect according to the present invention, an image sensing apparatus comprises a light source that shines light on an illumination portion of a document across the entire range in a direction along a longitudinal axis of the apparatus (hereinafter referred to as primary scan direction); a first mirror that receives incident light scattered by reflection from the document, to reflect the scattered light in a direction along a transverse axis of the apparatus (hereinafter referred to as secondary scan direction); a plurality of first concaved aspheric mirrors that collimates the light beams from the first mirror, to reflect therefrom the collimated light beams as substantially collimated light fluxes; an aperture mirror that reflects therefrom the light beams from the first aspheric mirrors, through apertures each having a light-shielded portion formed therearound and selectively passing the light beams therethrough; a plurality of second concaved aspheric mirrors that receives the light beams incident from the aperture mirror, to reflect the incident light beams as converging light beams; a second mirror that reflects the light beams in a direction perpendicular to the surface of the document, disposed on a path of the light beams to be converged by means of the respective second aspheric mirrors; a plurality of light receivers each having a light receiving area where the light beams from the second mirrors are incident, and images are thereby formed according to the light beams from the respective apertures; and a casing where at least the first and second aspheric mirrors are disposed on a first side of the casing in a secondary scan direction, and the aperture mirror is disposed on a second side thereof in the secondary scan direction.

In another aspect according to the present invention, an image sensing apparatus comprises a light source that shine light on an illumination portion of a document across the entire range in the primary scan direction, a first mirror that receives incident light scattered by reflection from the document, to reflect the scattered light in the secondary scan direction; a plurality of first concaved aspheric mirrors that collimate the light beams from the first mirror, to reflect therefrom the collimated light beams as substantially collimated light fluxes; an aperture mirror that reflects therefrom the light beams from the first aspheric mirrors, through apertures each having a light-shielded portion formed therearound and selectively passing the light beam therethrough; a plurality of second concaved aspheric mirrors that receive the light beams incident from the aperture mirror, to reflect the incident light beams as converging light beams; a second mirror that reflects the light beams in a direction perpendicular to the surface of the document, disposed on a path of the light beams to be converged by means of the respective second aspheric mirrors; a plurality of light receivers each having a light receiving area where the light beams are incident from the second mirror and images are thereby formed according to the light beam from the aperture; and a casing where at least the first and second aspheric mirrors are arranged in an array on a first side of the casing in the secondary scan direction, along the primary scan direction, and the apertures and the aperture mirror are arranged in respective arrays on a second side thereof in the secondary scan direction, therealong.

In yet another aspect according to the present invention, the image sensing apparatus comprises an RGB light source that shines light on an illumination portion of a document across the entire range in a primary scan direction; a first mirror that receives incident light scattered by reflection from the document, to reflect the scattered light in a secondary scan direction; a plurality of first concaved aspheric mirrors that collimates light beams from the first mirrors, to reflect therefrom the collimated light beams as substantially collimated light fluxes; an aperture mirror that reflects therefrom the light beams from the first aspheric mirrors, through apertures each having a light-shielded portion formed therearound and selectively passing the light beam therethrough; a plurality of second concaved aspheric mirrors that receives light beams incident from the aperture mirror, to reflect the incident light beams as converging light beams; a second mirror that reflects the light beams in a direction perpendicular to the surface of the document, disposed on a path of the light beams to be converged by means of the respective second aspheric mirrors; a plurality of light receivers each having RGB filters corresponding to the respective optical wavelengths of the RGB light beams in a light-receiving area where the light beams from the second mirrors are incident and images are thereby formed according to the light beams from the respective apertures; and a casing where at least the first and second aspheric mirrors are disposed on a first side of the casing in the secondary scan direction and the aperture mirror is disposed on a second side thereof in the secondary scan direction.

In yet another aspect according to the present invention, an image sensing apparatus comprises an RGB light source that shines light on an illumination portion of a document across the entire range in a primary scan direction; a first mirror that receives incident light scattered by reflection from the document, to reflect the scattered light in a secondary scan direction; a plurality of first concaved aspheric mirrors that collimates light beams from the first mirrors, to reflect therefrom the collimated light beams as substantially collimated light fluxes; an aperture mirror that reflects therefrom the light beams from the first aspheric mirrors, through apertures each having a light-shielded portion formed therearound and selectively passing the light beams therethrough; a plurality of second concaved aspheric mirrors that receives light beams incident from the aperture mirror, to reflect the incident light beams as converging light beams; a second mirror that reflects the light beams in a direction perpendicular to the surface of the document, disposed on a path of the light beams to be converged by means of the respective second aspheric mirrors; a plurality of light receivers each having RGB filters corresponding to the respective optical wavelengths of the RGB light beams in a light receiving area where the light beams from the second mirrors are incident and images are thereby formed according to the light beams from the respective apertures; and a casing where at least the first and second aspheric mirrors are arranged in respective arrays on a first side of the casing in the secondary scan direction, along the primary scan direction, and the aperture mirror is arranged in respective arrays on a second side thereof in the secondary scan direction, therealong.

In still another aspect according to the present invention, an image sensing apparatus comprises a fluorescent light source that shines fluorescent light on an illumination portion of a document across the entire range in a primary scan direction; a first mirror that receives incident light scattered by reflection from the document, to reflect the scattered light in a secondary scan direction; a plurality of first concaved aspheric mirrors that collimates light beams from the first mirrors, to reflect therefrom the collimated light beams as substantially collimated light fluxes; an aperture mirror that reflects the light beams from the first aspheric mirrors, through apertures each having a light-shielded portion formed therearound and selectively passing the light beams therethrough; a plurality of second concaved aspheric mirrors that receives the light beams incident from the aperture mirror, to reflect the incident light beams as converging light beams; a second mirror that reflects the light beams in a direction perpendicular to the surface of the document, disposed on a path of the light beams to be converged by means of the respective second aspheric mirrors; a plurality of light receivers that includes filters of a plurality of different light colors each having a wavelength longer than that of the blue light, in a light-receiving area where the light beams from the second mirrors are incident and images are thereby formed according to the light beams from the respective apertures; a casing where at least the first and second aspheric mirrors are disposed on a first side of the casing in the secondary scan direction, and the aperture mirror is disposed on a second side thereof in the secondary scan direction; and a low-cut filter that cuts off light wavelengths shorter than that of blue light, provided in each path of the light beams passing from the respective fluorescent light sources to the document.

In yet still another aspect according to the present invention, an image sensing apparatus comprises a plurality of light sources that shines fluorescent light beams on an illumination portion of a document across the entire range in a primary scan direction, a first mirror that receives incident light scattered by reflection from the document, to reflect the scattered light in the secondary scan direction; a plurality of first concaved aspheric mirrors that collimates the light beams from the first mirror, to reflect therefrom the collimated light beams as substantially collimated light fluxes; an aperture mirror that reflects therefrom the light beams from the first aspheric mirrors, through apertures each having a light-shielded portion formed therearound and selectively passing the light beams therethrough; a plurality of second concaved aspheric mirrors that receives the light beams incident from the aperture mirror, to reflect the incident light beams as converging light beams; a second mirror that reflects the light beams in a direction perpendicular to the surface of the document, disposed on a path of the light beams to be converged by means of the respective second aspheric mirrors; a plurality of light receivers that includes filters of a plurality of different light colors each having a wavelength longer than that of the blue light, in a light receiving area where the light beams from the second mirrors are incident and images are thereby formed according to the light beam from the apertures; a casing where at least the first and second aspheric mirrors are arranged in respective arrays on a first side of the casing in the secondary scan direction, along the primary scan direction and the apertures and the aperture mirror are disposed in respective arrays on a second side thereof in the secondary scan direction, therealong; and a low-cut filter that cuts off light wavelengths shorter than that of blue light, provided in each path of the light beams passing from the respective fluorescent light sources to the document.

In the image sensing apparatus according to the present invention, a compact image sensing apparatus can be provided by repeatedly reflecting, in an alternate direction, light beams in the casing even in a long optical path, notwithstanding the subject-to-camera distance is deep. In the image sensing apparatus according to the present invention, arrangement in an array of multiple second aspheric mirrors can achieve an image sensing apparatus with a long sensing path.

These and other objects of the present invention will be better understood by reading the following detailed description in combination with the attached drawings of a preferred embodiment of the invention.

BRIEF DESCRIPTION OF THE DRAWINGS

FIG. 13 is a schematic diagram for illustrating how light beams pass through in the image sensing apparatus in accordance with Embodiment 1 of the present invention;

FIG. 14 illustrates rearrangement of inverted image data of the image sensing apparatus in accordance with Embodiment 1 of the present invention; FIG. 14A shows situations without interpolation of image information and FIG. 14B shows those with the interpolation;

FIG. 16 is a schematic diagram embodying optical paths in the secondary scan direction of the image sensing apparatus in accordance with Embodiment 1 of the present invention;

FIG. 17 illustrates a light shield of the image sensing apparatus in accordance with Embodiment 1 of the present invention.

FIG. 18 is a sectional view of an image sensing apparatus in accordance with Embodiment 2 of the present invention;

FIG. 22 is a schematic diagram illustrating light shields provided on an optical lens system of the image sensing apparatus in accordance with Embodiment 2 of the present invention;

FIG. 23 illustrates situations where a different LED light source is used for an image sensing apparatus in accordance with Embodiment 3 of the present invention; FIG. 23A is a schematic diagram illustrating light source portions including the light guide; and FIG. 23B is a schematic diagram showing a partially enlarged portion in the vicinity of the electrode section;

FIG. 25 is a schematic diagram illustrating situations where an LED for emitting violet light is used for an image sensing apparatus in accordance with Embodiment 3 of the present invention, and shows relative light outputs against each of the wavelengths, in situations where a cut filter for excluding emitted fluorescent light beams is provided or not.

DESCRIPTION OF THE PREFERRED EMBODIMENTS

Embodiment 1

Figure 1:
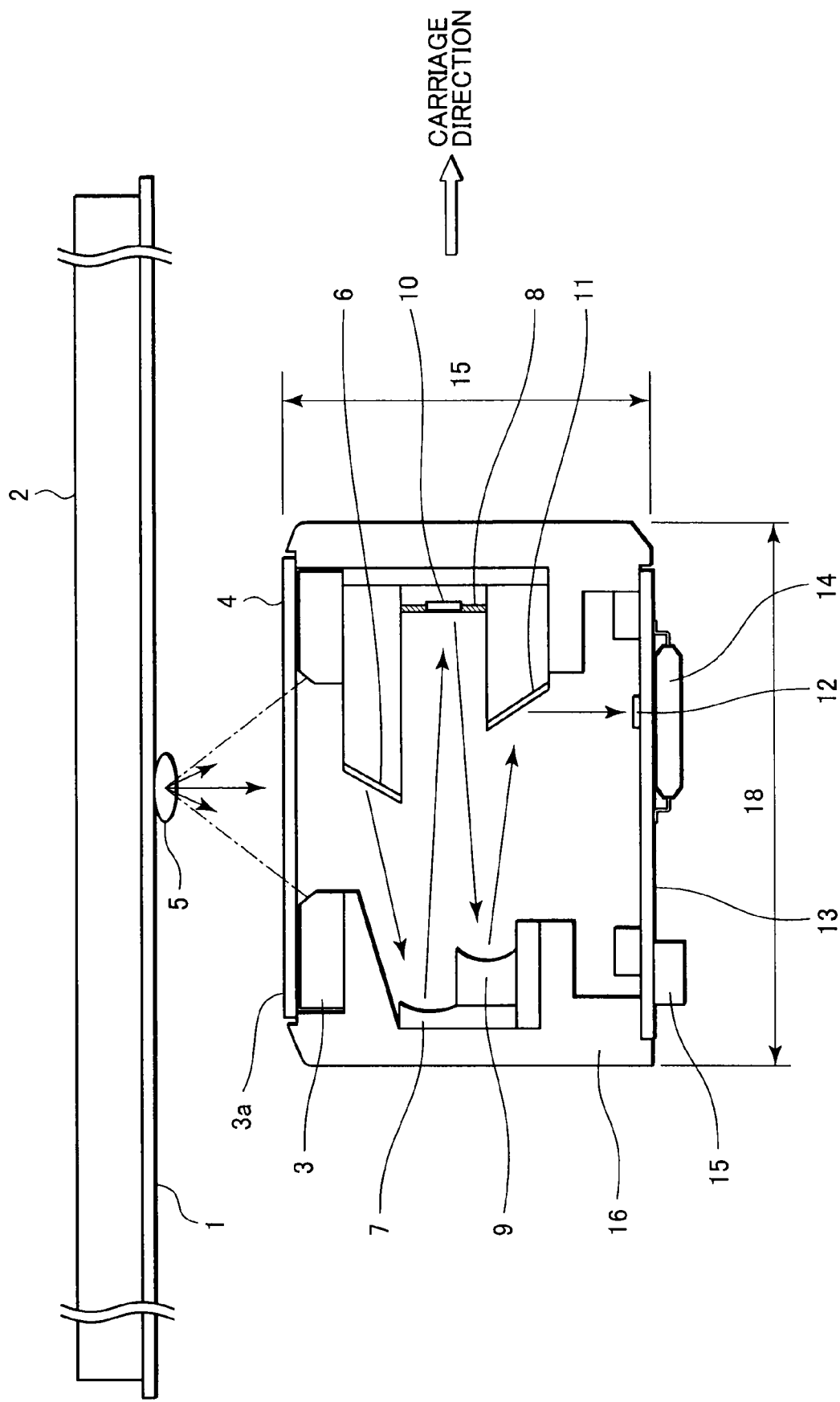
FIG. 1 is an internal view of an image sensing apparatus in accordance with Embodiment 1 of the present invention.

An image sensing apparatus in accordance with Embodiment 1 of the present invention will be described below with reference to FIG. 1. FIG. 1 is a schematic diagram illustrating an internal view of the image sensing apparatus in accordance with Embodiment 1 of the present invention. Referring to FIG. 1, an illuminated object (referred to as a paper sheet) such as a document or a medium, is indicated at numeral 1; a platen 2 supports the illuminated object 1; light guides 3 transmit light beams; light-emitting portions of the light guides 3 are indicated at numeral 3a; the light beams pass through a light transmission member 4; an illumination portion of the illuminated object 1 is indicated at numeral 5; a first mirror 6 reflects in a secondary scan direction scattered light incident from the illumination portion 5; first concaved lens mirrors 7 (also referred to as first lenses, or first aspheric mirrors) receive the light beams reflected from the first mirror 6; an aperture mirror 8 receives collimated light beams incident from the first lens mirror 7; second concaved lens mirrors 9 (also referred to as second lenses, or second aspheric mirrors) receive the light beams reflected from the aperture mirror 8; apertures 10 each having a light-shielded portion formed therearound are provided on the surface of the aperture mirror 8 that mitigate aberration of light beams incident upon and reflected from the aperture mirror 8; and a second mirror 11 receives the light beams from the second lenses 9 and reflects the incident light beams therefrom.

An image sensor MOS integrated circuit chip 12, constituted of an opto-electric conversion circuit and its drive section, receives via the second mirror 11 light beams reflected from the second lenses 9; a sensor substrate 13 mounts the image sensor integrated circuit chip 12 thereon; a signal processing integrated circuit (ASIC) 14 processes opto-electrically converted signals; components 15 such as capacitors and resistors are mounted on the image sensor substrate 13; and a casing 16 houses the optical system including the image sensor substrate 13.

Figure 2:
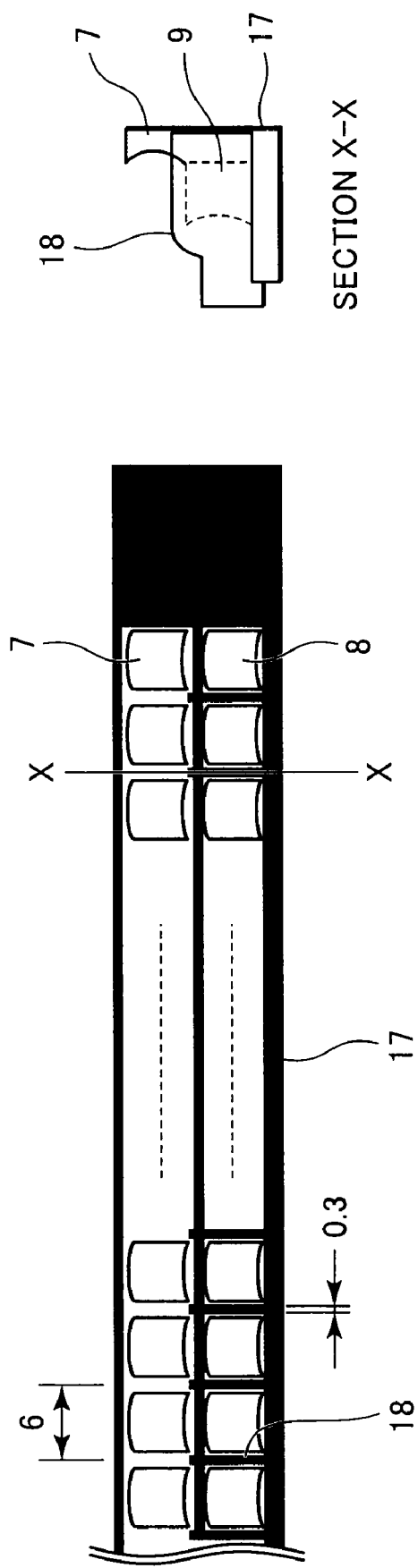
FIG. 2 is a schematic diagram of a configuration of an optical lens system in the image sensing apparatus and a cross-sectional view taken along line X-X, in accordance with Embodiment 1 of the present invention.

FIG. 2 is a schematic diagram illustrating an optical lens system disposed in an array with a 6 mm pitch, mounted on the image sensing apparatus in accordance with Embodiment 1 of the present invention; a lens mount 17 integrally disposes the first lenses 7 and second lenses 9; and a light shield 18 protects light interference occurring between the first lenses 7 and the second lenses 9 each disposed in an array on the lens mount 17. The lens mount 17, the first lens 7 and the second lens 9 are made of acrylic resin, being coated with a black shielding substance except for lens mirror surfaces. The lens mount 17, the first lens 7 and the second lens 9 may be integrally formed with acrylic resin. In the figures, like reference numerals as in FIG. 1 indicate like parts or corresponding portions.

Figure 3:
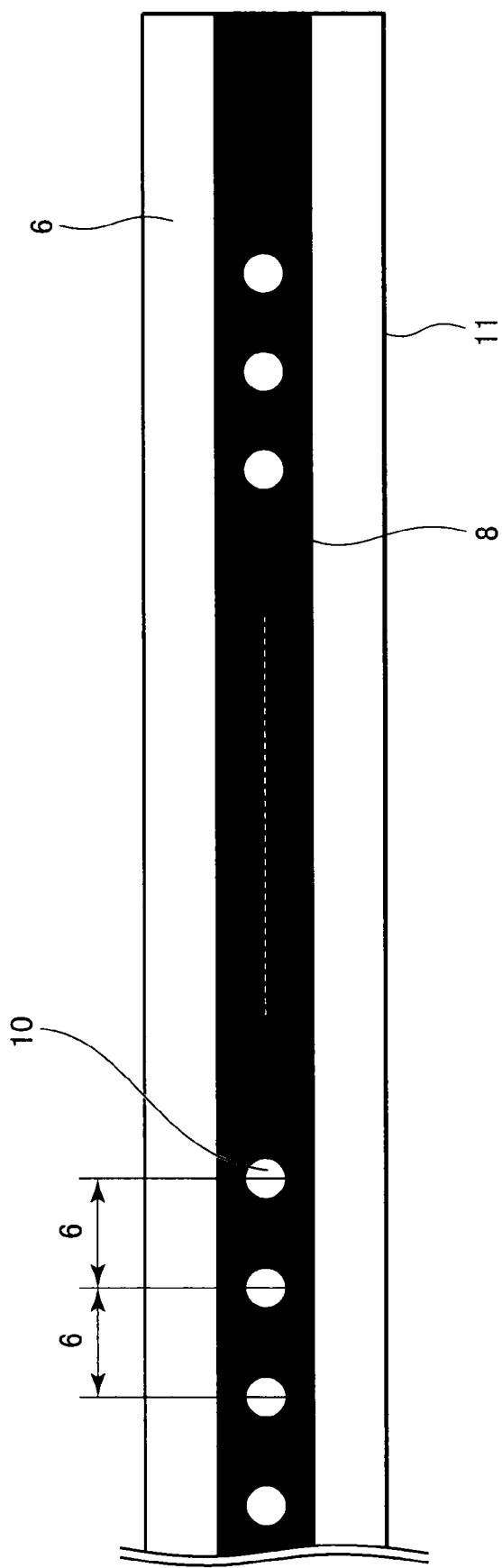
FIG. 3 is a schematic diagram illustrating an optical mirror system of an image sensing apparatus in accordance with Embodiment 1 of the present invention.

FIG. 3 is a schematic diagram of the optical mirror system; the first mirror 6 and second mirror 11 are continuously disposed longitudinally so that both mirrors are located opposite each other with the aperture mirror 8 therebetween. The surface of the aperture mirror 8, made of black resin or sheet metal, is provided in an array with openings spaced apart at 6 mm intervals. In the figures, like reference numerals as in FIG. 1 indicate like parts or corresponding portions.

Figure 4:
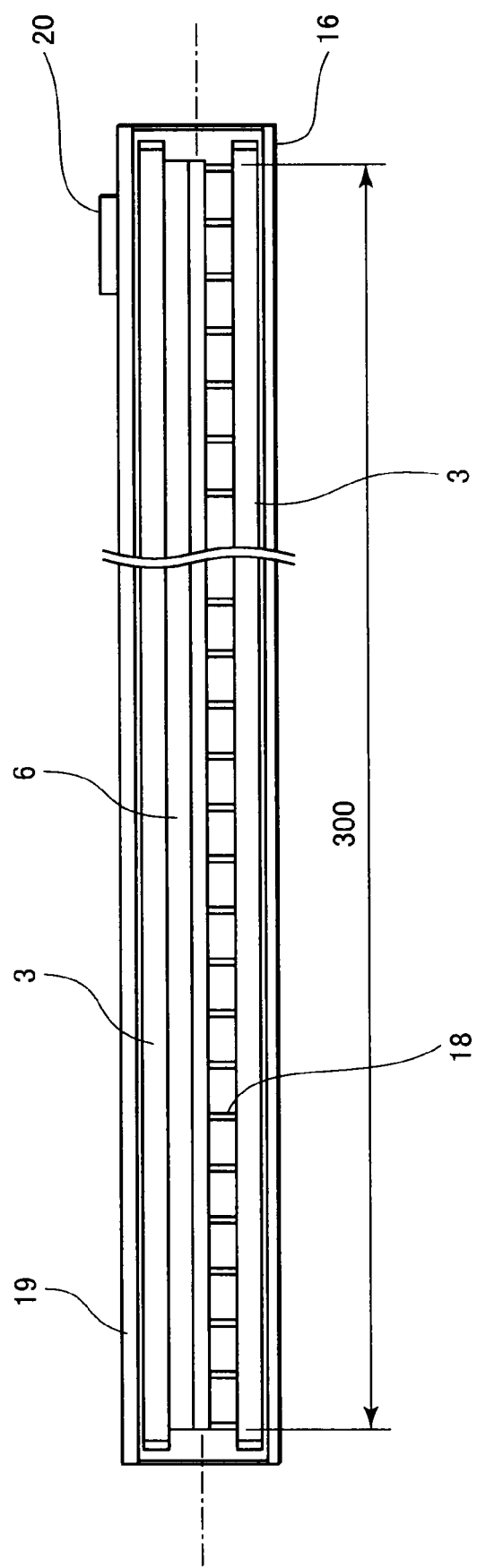
FIG. 4 is a plan view of the image sensing apparatus in accordance with Embodiment 1 of the present invention.

FIG. 4 is a plan view of the image sensing apparatus in accordance with Embodiment 1 of the present invention; a light source 19 emits light into the light guide 3; and a connector 20 provides an I/O interface through which control signals that drives the image sensing apparatus are delivered.

Figure 5:
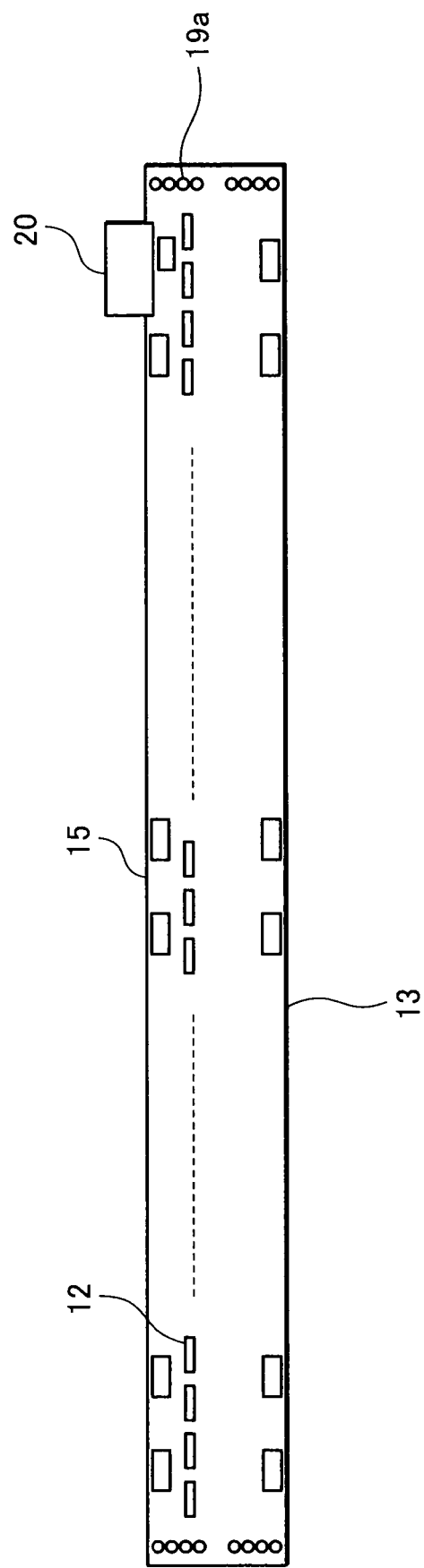
FIG. 5 is a plan view of a sensor substrate in accordance with Embodiment 1 of the present invention.

FIG. 5 is a plan view of a sensor substrate 13; a light source connection section 19a electrically connects the light source 19 to the connector 20 of the sensor substrate 13.

Figure 6:
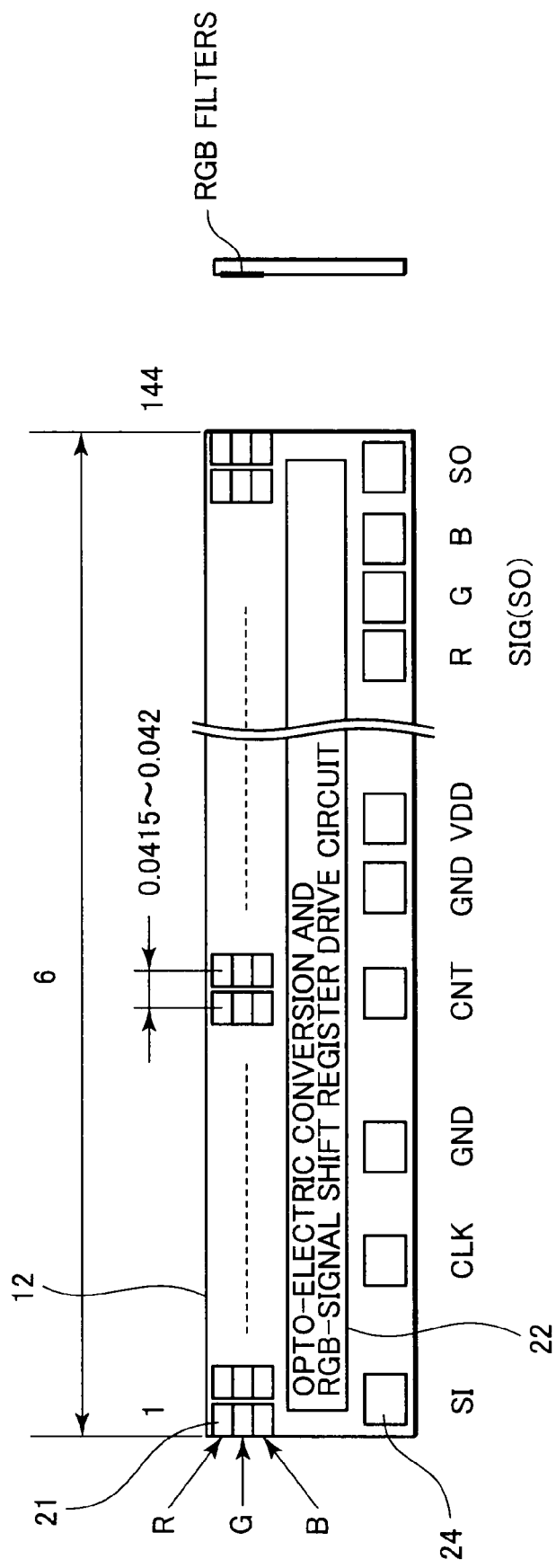
FIG. 6 is a plan view and a side view of an image sensor integrated circuit chip in accordance with Embodiment 1 of the present invention.

FIG. 6 is a plan view of the image sensor integrated circuit chip 12; The light receiving surface of a light receiving section 21 (a cell) is provided with an RGB filter made of a substance such as gelatin of red, green and blue lights for each pixel; an opto-electrical conversion and RGB shift register drive circuit 22 opto-electrically converts on an RGB basis the light beam incident on the cell 21, and retains their electrical outputs, to drive the shift register; and a wire bonding pad 24 inputs or outputs signals and receives or supplies electrical power, to the sensor integrated circuit chip 12 therethrough.

Figure 7:
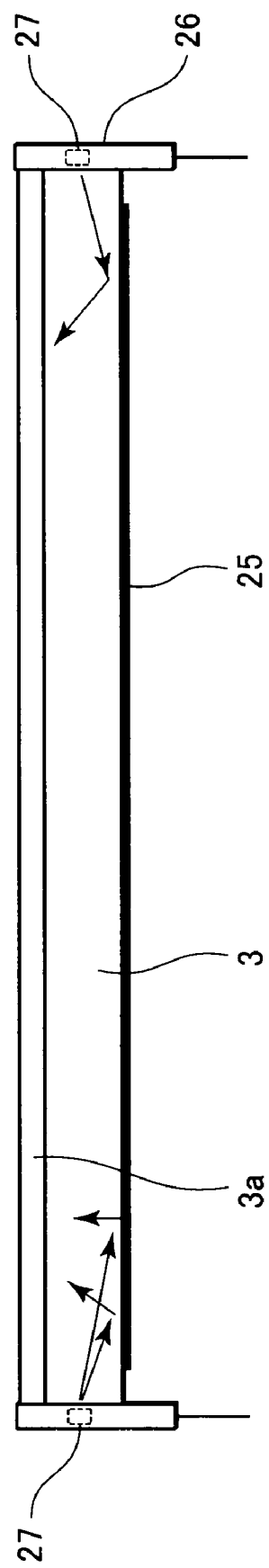
FIG. 7 is a schematic diagram for illustrating light source portions including a light guide in accordance with Embodiment 1 of the present invention.
Figure 8:
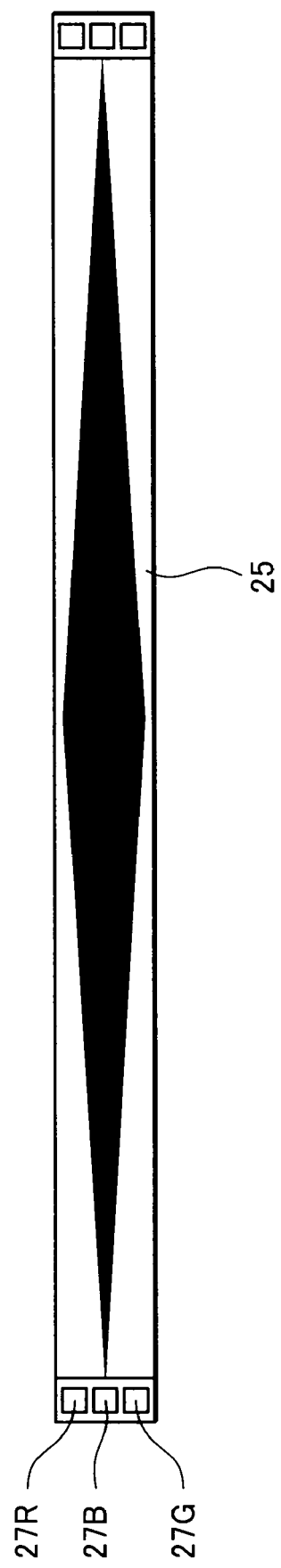
FIG. 8 is another schematic diagram for illustrating the light source portions including the light guide in accordance with Embodiment 1 of the present invention.

FIG. 7 is a schematic diagram for illustrating light source portions including the light guide 3; a light scatter layer 25 uniformly shine the light beam across the entire range in a primary scan direction from the light emitting section 3a of the light guide 3; electrode sections 26 are disposed at both ends of the light guide 3; light sources 27 are constituted by light emitting diodes (LED chip array) each emitting a red, green or blue wavelength light beam. As shown in FIG. 8, each of the electrode sections 26 is provided with an R light source (27R), a B light source (27B) and a G light source (27G). When the light sources 27 each are disposed on both ends of the light guide 3, the width of the light scatter layer 25 is made greater at its midsection in a primary scan direction—i.e., a direction along the longitudinal axis of the apparatus, while when disposed on one end, the light layer width is made greater as the light sources 27 recedes, thus ensuring uniform light emission from a light-emitting section 3a.

Figure 9:
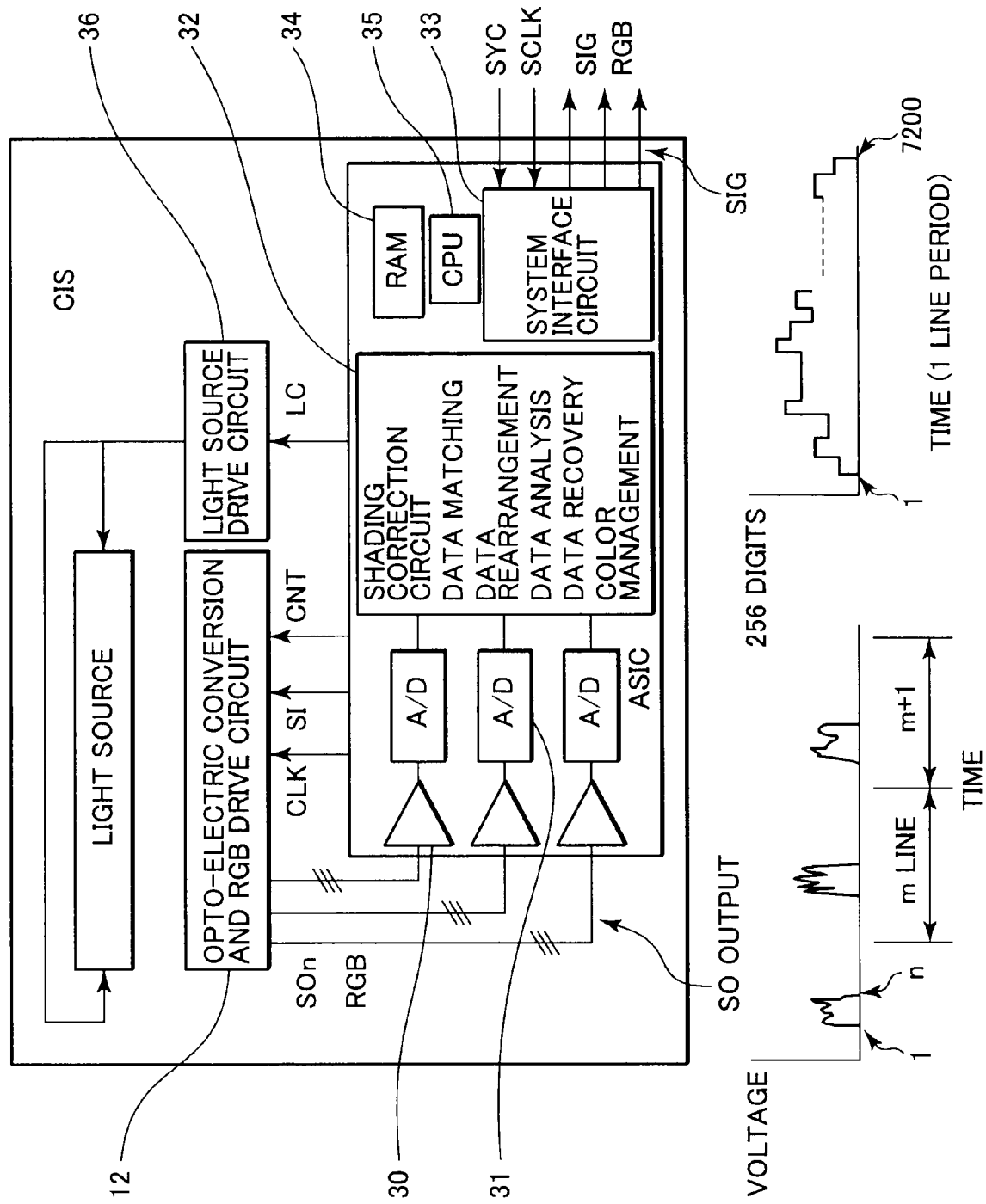
FIG. 9 is a block diagram of the image sensing apparatus in accordance with Embodiment 1 of the present invention.

Here, the optical wavelength of each of the RGB light sources 27 is substantially coincident with that of light of each color of the RGB filters provided on the light receiving section 21. In FIGS. 4 through 7, like reference numerals as in FIG. 1 indicate like parts or corresponding portions. FIG. 9 is a block diagram illustrating the image sensing apparatus according to Embodiment 1; an amplifier 30 amplifies a signal opto-electrically converted with the sensor integrated circuit chip 12; an analog-digital converter (an A/D converter) 31 performs analog-digital conversion of the amplified opto-electrical conversion output; a signal processing section 32 performs signal processing of digitized output signals for each RGB component; a system interface circuit 33 allows for signal/data transfers between an image sensing apparatus (also referred to as CIS, contact image sensor) and the main system; and a random-access memory (RAM) 34 stores image information for each color. A CPU is indicated at numeral 35; a light source drive circuit is indicated at numeral 36.

Figure 10:
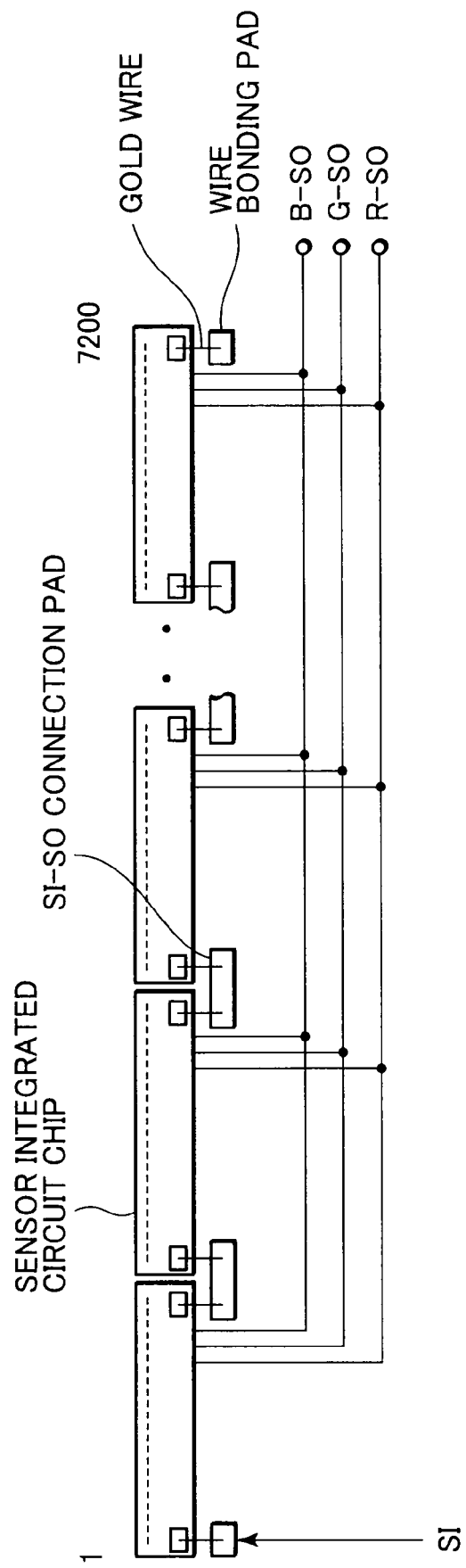
FIG. 10 is an interconnection diagram between the image sensor integrated circuit chips of the image sensing apparatus in accordance with Embodiment 1 of the present invention.
Figure 11:
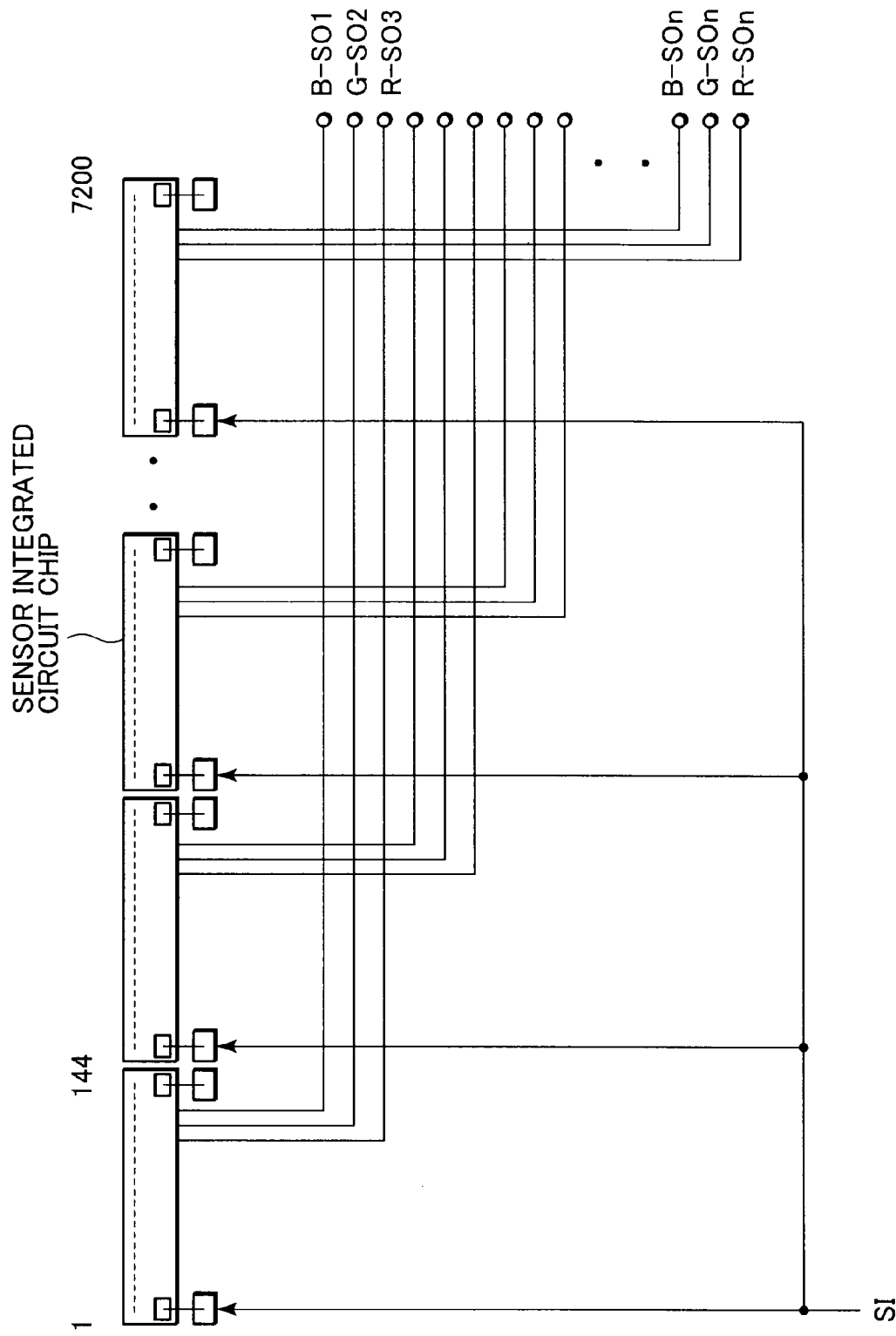
FIG. 11 is an interconnection diagram of another example of the image sensor integrated circuit chips of the image sensing apparatus in accordance with Embodiment 1 of the present invention.

Next, the operation of the image sensing apparatus in accordance with Embodiment 1 of the present invention will be described below. With reference to FIG. 9, based on a system control signal (SYC) and a system clock signal (SCLK) delivered from the main system, a clock signal (CLK) of the signal processing integrated circuit (ASIC) 14 and a start signal (SI) synchronized with the CLK are outputted via the system interface circuit 33 to the sensor integrated circuit chip 12. With the timing, the sensor integrated circuit chip 12 outputs sequential analog signals of each pixel (n) for each sensing line (m). FIG. 10 exemplifies that the analog signal for 7200 pixels is outputted sequentially, while FIG. 11 illustrates that each 144 pixel signal is outputted as a unit of a segmented output signal.

Analog signals amplified with the amplifier 30 are converted with the A/D converter 31 into digital signals; after the A/D conversion, the signal output for each pixel (bit) is processed in a correction circuit that performs a shading correction or all-bit correction. This correction is made by the following processes: first, signal data are pre-read using a standard test chart such as a white paper sheet; next, correction data by equalization is stored in the RAM 34; then the correction data is read out from the RAM 34; and finally, digital signals corresponding to A/D converted image information is processed arithmetically. Such sequential actions are controlled by the CPU 35. The correction data is intended to correct variations of sensitivity between elements of the sensor integrated circuit chip 12, or disuniformities of the respective light sources 27.

Figure 12:
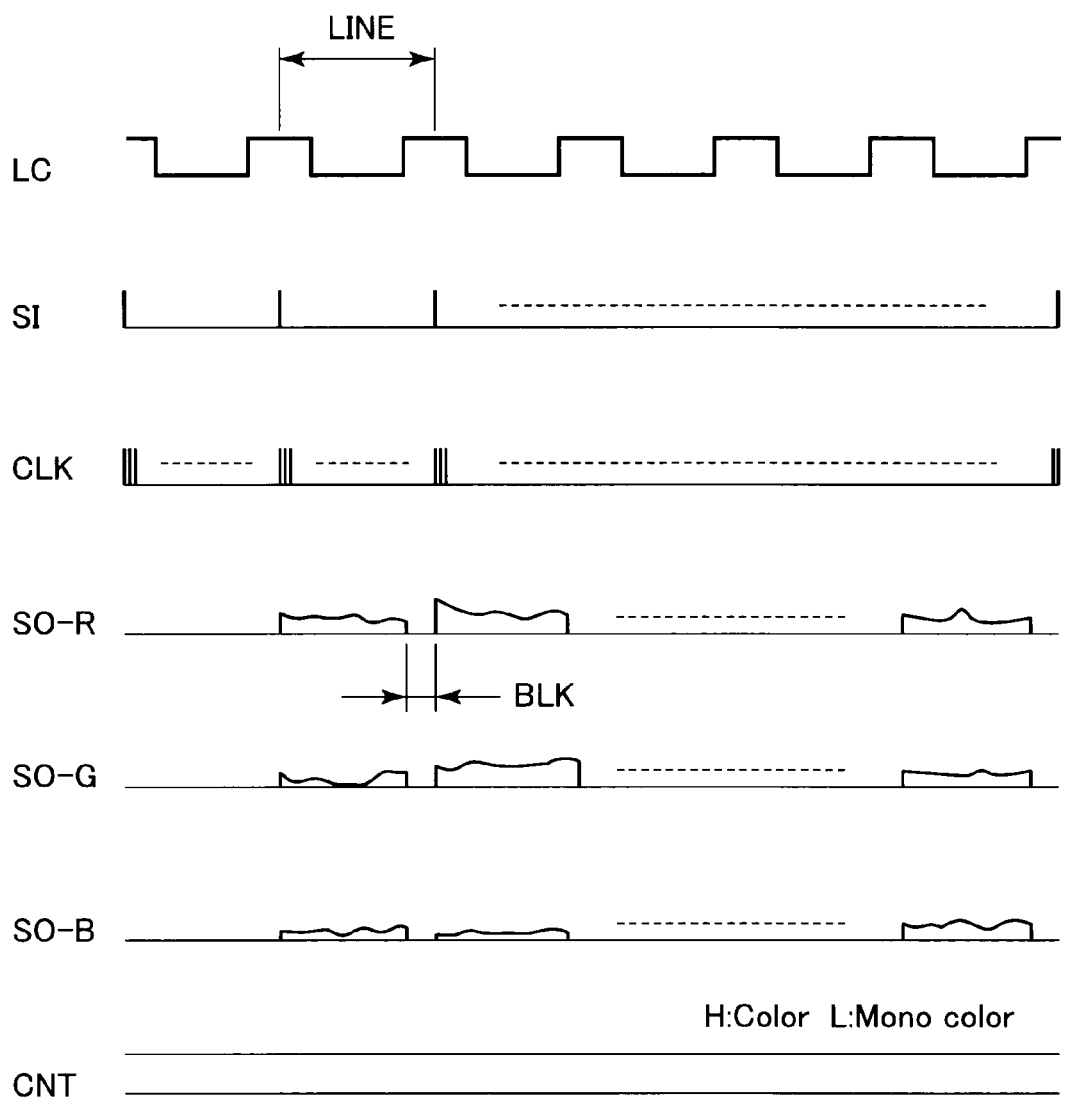
FIG. 12 is a signal timing diagram of the image sensing apparatus in accordance with Embodiment 1 of the present invention.

Next, a drive timing of the image sensing apparatus in accordance with Embodiment 1 of the present invention will be described with reference to FIGS. 9 and 12. Referring to FIGS. 9 and 12, the ASIC 14 turns ON a light-source-on-signal with the CPU 35 interfaced therewith; in response to this, the light source drive circuit 36 supplies the power to each of the light sources 27 for a predetermined time, thus causing the RGB light sources 27 to emit white light. In synchronization with the continuously generated CLK signal, the start signal (SI) sequentially turns ON a shift register output from each element (pixel) that configures the RGB drive circuit in the sensor integrated circuit chip 12. A group of corresponding switches sequentially open and close the SIG (SO) lines, thereby acquiring the RGB image information (image output data) synchronized with the CLK signal. This image output is each image output data read and stored in the previous line. Here, a CNT signal is a color/monochrome switching signal, and typically, the color mode signal is set to a high level. A blanking (BLK) time is assigned to each color sensing period of a single line, thus varying a setting of exposure time; accordingly, all the SIG (SO) are left open during each BLK interval.

Next, the sequentially outputted image signal SIG (SO) will be described with reference to FIG. 13. FIG. 13 is a schematic diagram for illustrating how light beams in the primary scan direction pass through in the image sensing apparatus; the illumination portion 5 varies, in the direction perpendicular to the carriage surface, according to the thickness of the illuminated object 1; When a point light source is assumed on the surface of the object 1, scattered light, i.e., image information of the illuminated object 1 enters, via the first mirror that reflects the light beams in the secondary scan direction, the first concaved aspheric mirrors that each collimate the scattered light beams to thereby reflect them as substantially collimated light fluxes. The light beams from each optical system arranged in an array are focused on apertures (openings) placed discretely with 6 mm intervals; Furthermore, the light beams emitted from the openings enter the sensor integrated circuit chip 12 for each light flux, via lenses fitted with the light shields 18 that each protect light interference for each array; as a result, image information is focused as an inverted image on the light-receiving surface of the sensor integrated circuit chip 12. Thus, the image information, focused on the light receiving portion (also referred to as pixels) of the sensor integrated circuit chip 12, is displayed as an inverted image with respect to the illuminated object 1 such as a paper sheet. By shift-register sequential switching signals delivered to the drive circuit of the sensor integrated circuit chip 12, the SIG (SO) signals as analog signals are concurrently outputted in three lines for each RGB signal.

FIG. 14 illustrates rearrangement of inverted image data of the A/D converted RGB signals; FIG. 14A shows rearrangement of the data for each 144 bits. In FIG. 14A, each of the RGB (SO) signals is processed as follows: data shifted leftward in a shift register circuit is stored in each cell configured by a shift register circuit, and then the data are latched with a latch signal (LA); subsequently, the RAM 34 stores data, as SIG (SO) signals, that are sequentially rearranged with a write signal (WR) starting with the first cell of the sensor integrated circuit chip 12, then the stored data are corrected by computing.

FIG. 14B illustrates an example where there is a need for virtual bits (elements) generated between the light receiving portions 21 disposed in the outermost position of the sensor integrated circuits 12; the virtual bit data is transferred to the RAM 34, with a data address added thereto as simply averaged outermost position data. In this case, the RAM 34 also stores data that preliminarily incorporates the virtual bits, thus processing arithmetically to correct the stored data. The image data thus corrected by computing are outputted as SIG (RGB) color data, via the system interface circuit 33, by means of color conversion, color management engine and the like, through a color management system including data analysis and data recovery, as is disclosed in Japanese Unexamined Patent Publication H8-28966 (FIG. 1).

Figure 15:
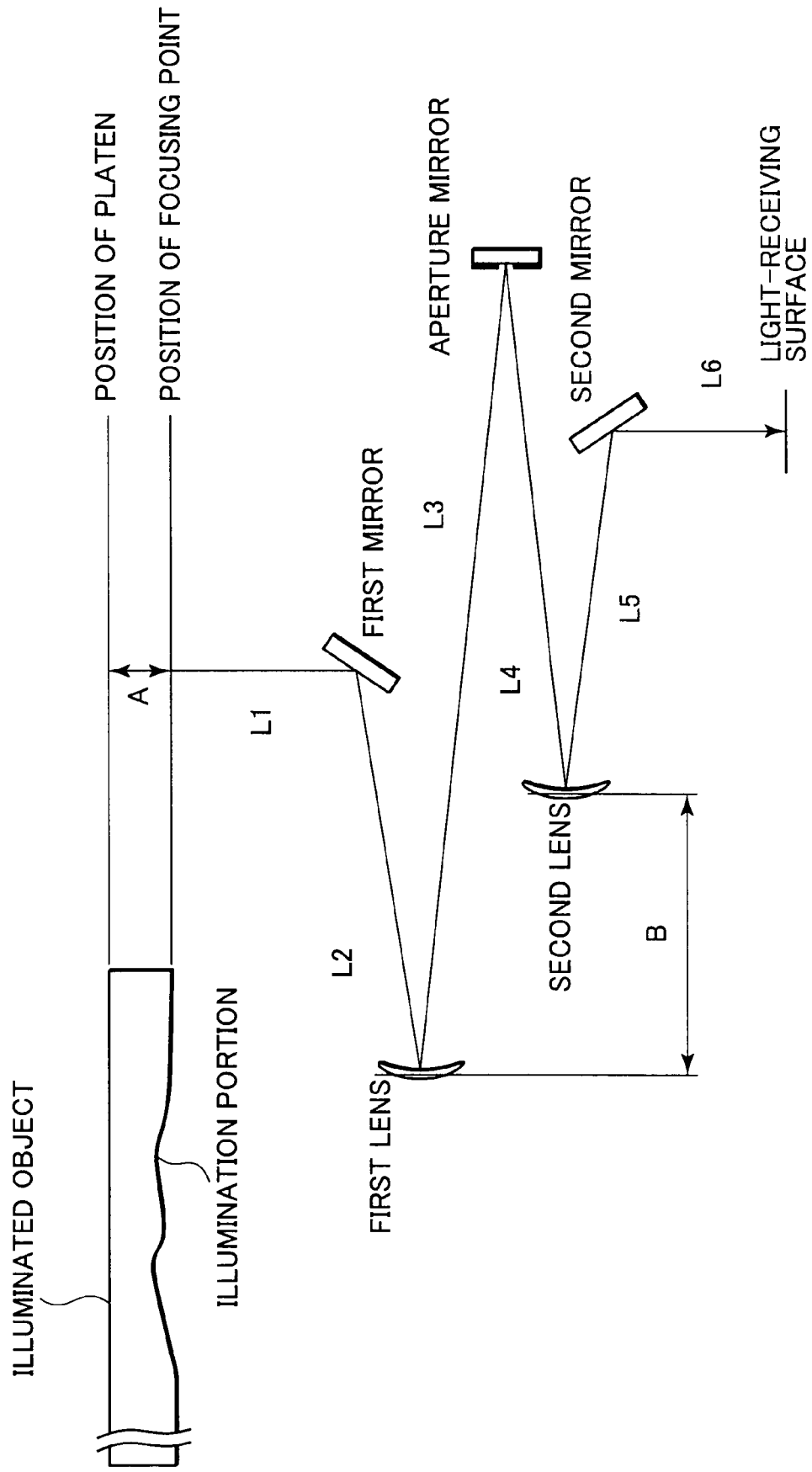
FIG. 15 is a schematic diagram for illustrating optical lengths in a secondary scan direction of the image sensing apparatus in accordance with Embodiment 1 of the present invention.

FIG. 15 is a schematic diagram illustrating optical lengths in the secondary scan direction; the position of the first focal point of the respective first lenses 7 is substantially coincident with the variable illumination portion 5 of the illuminated object 1, while the position of the second focal point thereof is coincident with that of the aperture mirror 8. The position of the first focal point of the second lenses 9 is coincident with the aperture mirror 8, while the position of the second focal point thereof is coincident with the light receiving surface. In other words, the following relationships hold: L3=L1+L2, L4=L5+L6, and L3=L4+B, as are shown in FIG. 16. FIG. 16 embodies optical paths in the secondary scan direction; Substantially collimated light beams travel optical distances L3 and L4 from the first lens 7 to the second lens 9. It should be noted that the scattered light to be reflected from the first mirror in the secondary scan direction may be emitted in any direction toward the mirror, and the light receiving portion 21 may be located in an arbitrary position as long as the relationship L4=L5+L6 is satisfied.

Figure 17A:
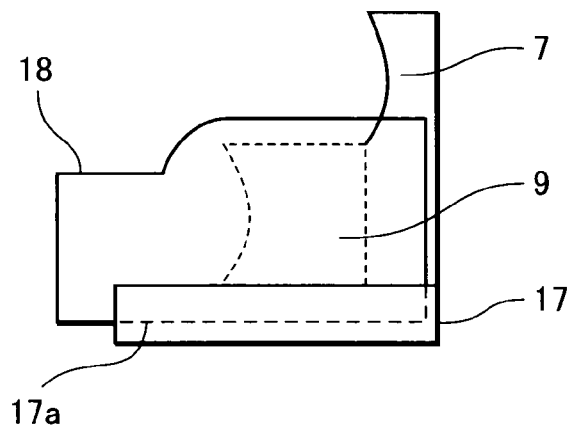
FIG. 17A is an elevational view of the light shield provided on the optical lens system.
Figure 17B:
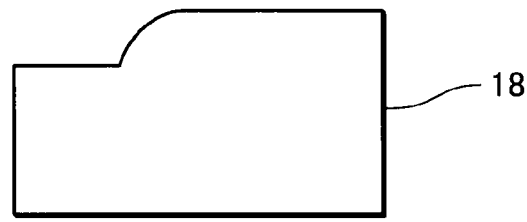
FIG. 17B is an elevational view showing the light shield.
Figure 17C:
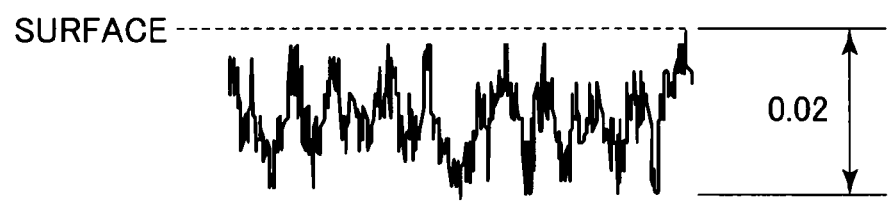
FIG. 17C is a view showing surface roughness of the light shield.

FIG. 17 illustrates the light shields 18 to be provided on the first lenses 7 and second lenses 9 that are integrally configured. In FIG. 17A, each of grooves (grooved portions) of the lens holder stand 17, indicated at numeral 17a, is provided between the lenses each arranged in an array. Fitting each of the light shields 18 into the respective grooves 17a protects a light beam from leaking largely to the neighboring second lenses 9. FIG. 17B is a partially enlarged view of the respective light shields 18; the surfaces of the light shields 18 each having a thickness of 0.3 mm, made of carbon glass material, are sandblasted or etched, and roughed to approximately 0.02 mm peak to peak as illustrated in FIG. 17C. Such surface treatment completely absorbs unwanted light beams that enter in the proximity of both ends of the second lenses 9 in the primary scan direction and are reflected by the light shields 18. In addition, when reflectance, albeit in black color, is 15-20% by roughing the surface of acrylic resin through vapor-deposition of black nitride film substance, a ghost phenomenon in generated images can be reduced structurally (hardware-wise).

From the foregoing description, in the image sensing apparatus in accordance with Embodiment 1 of the present invention, the aperture mirror to reflect the light beams incident from the first aspheric mirrors, the second concaved aspheric mirrors that receive the light beam incident from the aperture mirror, to reflect the incident light beams as converging light beams, are disposed on a first side of the casing in the secondary scan direction, and the aperture mirror is disposed on the second side thereof in the secondary scan direction; as a result, a compact image sensing apparatus can be provided by reflecting light beams inside the casing even in a long optical path, notwithstanding the depth of field is deep.

In addition, the RGB light color is used for the respective light sources 27, RGB filters corresponding to the RGB light color from the light sources 27 are used on the light-receiving side, and additionally, the surfaces of the light-absorbing black light shields 18 are roughed; thus, in comparison with a light source having a wide wavelength such as in a fluorescent lamp, sharp and high quality image information being ghost-free images and matching with dropout colors can be achieved.

Embodiment 2

As has been described in Embodiment 1, the light beams from both-end light sources are shone on the illuminated object 1 by using the rod-like light guides 3, while in Embodiment 2, an array light source is used, as will be described below. FIG. 18 is a schematic diagram illustrating a cross-sectional view of the image sensing apparatus in accordance with Embodiment 2 of the present invention. In FIG. 18, a vertical light guide 130 transmits a light beam; a light-emitting portion of the light guide 130 is indicated at numeral 130a. A cover 140 is comprised of a plastic material having a slit, through which the light beams pass, in the neighborhood of the illumination portion 5 and constitutes part of a carriage path of the illuminated object 1; a first mirror 160 reflects scattered light incident from the illumination portion 5; first concaved lens mirrors 170 (first lenses) each receive the light beams reflected from the first mirror 160; an aperture mirror 180 receives collimated light beams incident from the first lens mirrors 170; and second concaved lens mirrors 190 (second lenses) receive the light beams reflected from the aperture mirror 180.

A second mirror 200 receives the light beams from the second lenses 190 and reflects the incident light beams therefrom; a sensor substrate 201 mounts the image sensor integrated circuit chips 12 and the light sources 27 thereon in respective arrays; a casing 202 houses the optical system including the image sensor substrate 201. A holder stand 202a of the light guide 130 constitutes part of the casing 200; pulleys (carriage pulleys) 203 carry the illuminated object 1. In the figures, like reference numerals as in FIG. 1 indicate like parts or corresponding portions.

Figure 19:
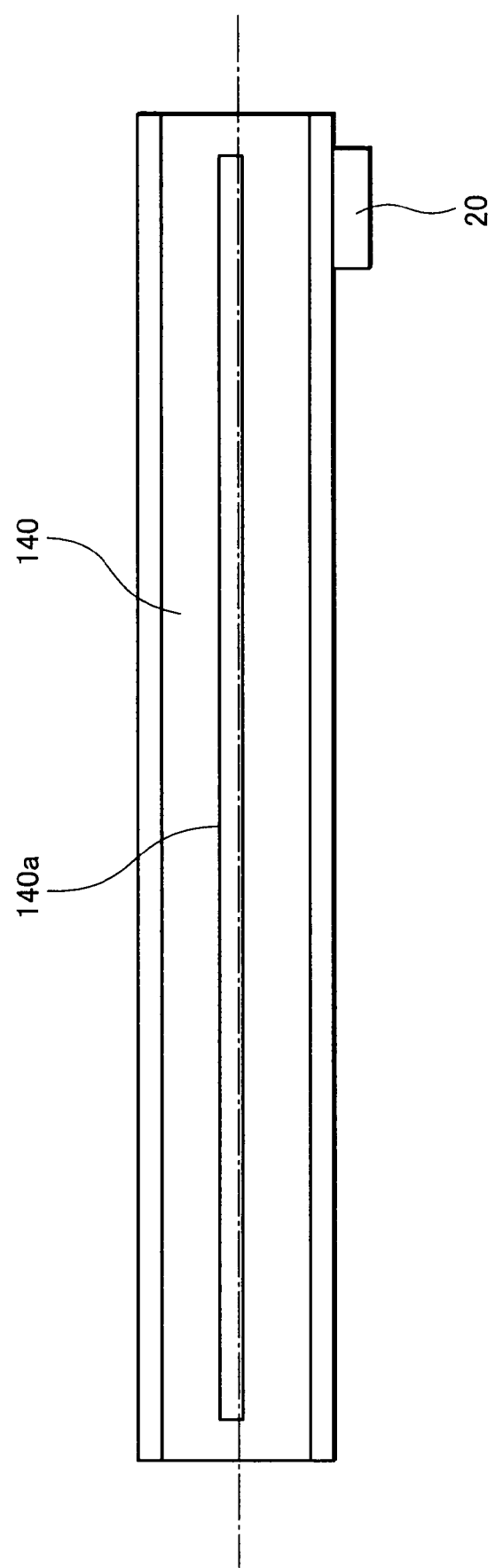
FIG. 19 is a plan view of the image sensing apparatus in accordance with Embodiment 2 of the present invention.

FIG. 19 is a plan view illustrating the image sensing apparatus in accordance with Embodiment 2 of the present invention; a slit portion 140a of the cover 140 is provided in the sensing area in the primary scan direction.

Figure 20:
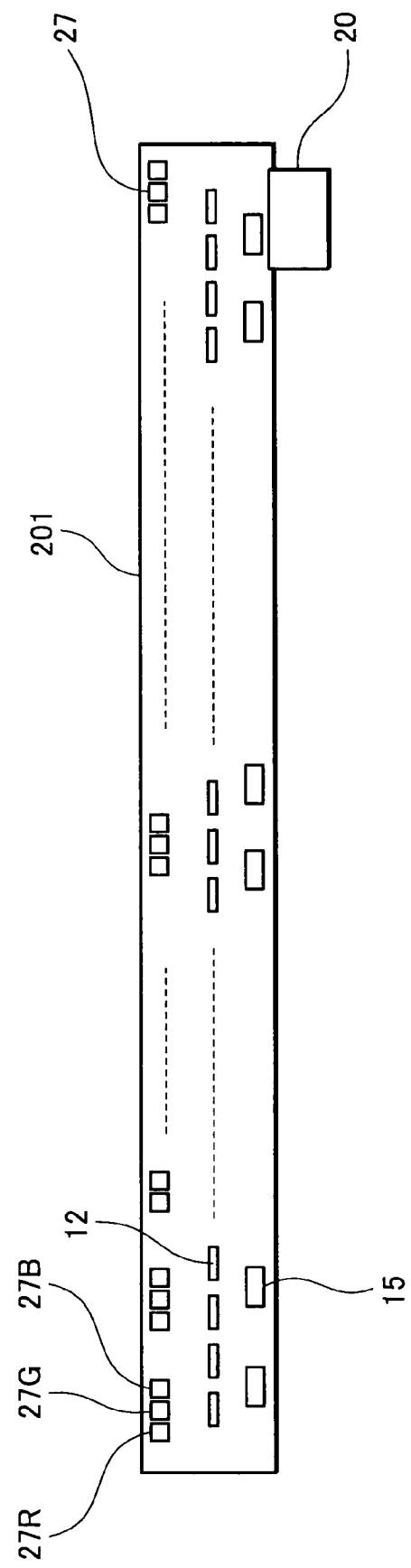
FIG. 20 is a plan view of a sensor substrate in accordance with Embodiment 2 of the present invention.

FIG. 20 is a plan view of a sensor substrate 201. Each of the light sources 27 is constituted by RGB color LED chips that are sequentially disposed in both end portions in the primary scan direction of the sensor substrate 201. The drive power for the respective RGB light sources 27 is supplied through the connector 20.

Figure 21:
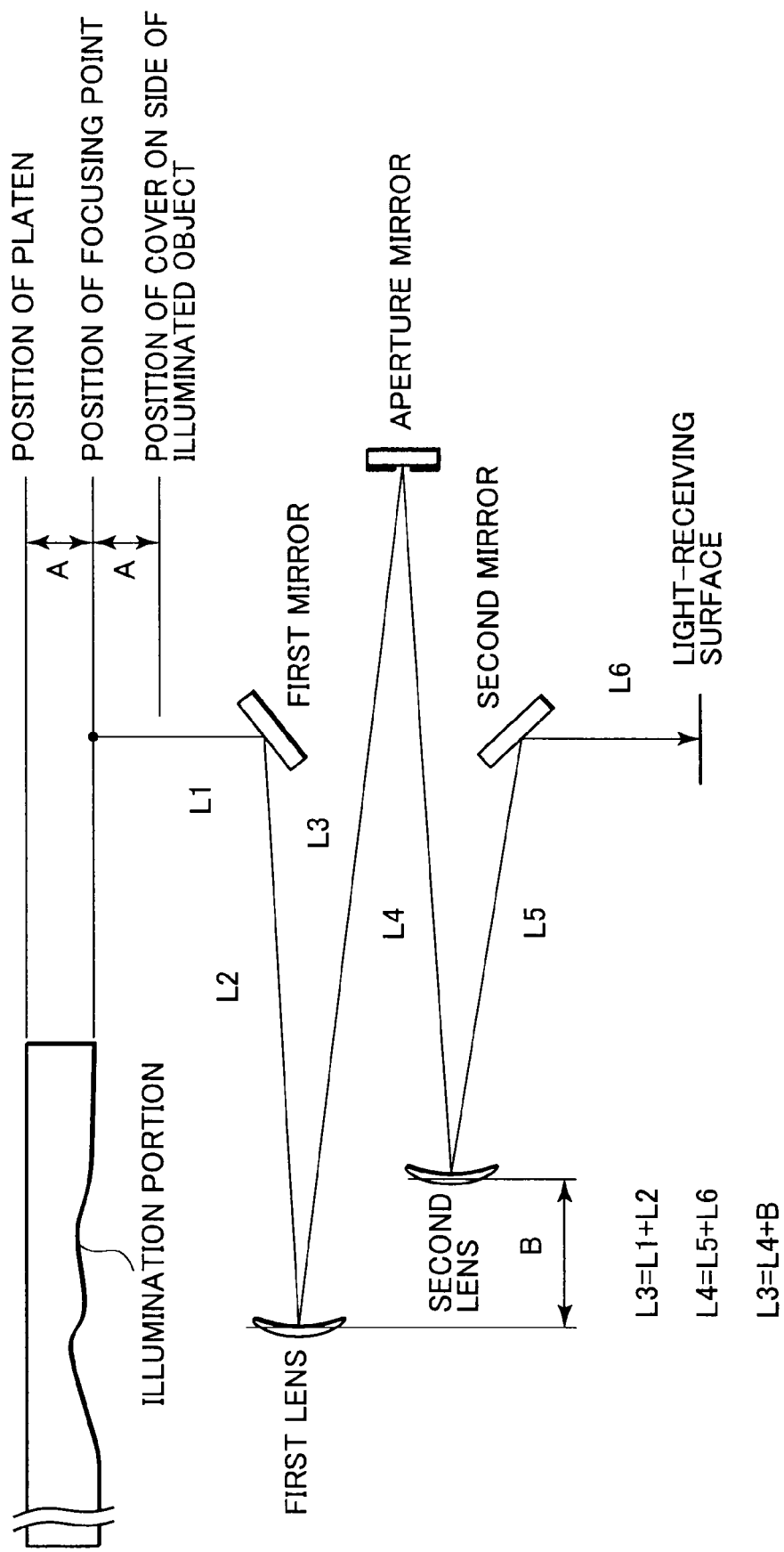
FIG. 21 is a schematic diagram for illustrating optical lengths in the secondary scan direction in the image sensing apparatus in accordance with Embodiment 2 of the present invention.

FIG. 21 is a schematic diagram illustrating optical lengths in the secondary scan direction in the image sensing apparatus in accordance with Embodiment 2 of the present invention. The position of the first focal point of the respective first lenses 170 is coincident with the midsection between the platen 2 and the illuminated object 1 side of the cover 140, while the position of the second focal point thereof is coincident with that of the aperture mirror 180. The position of the first focal point of the respective second lenses 190 is coincident with the aperture mirror 180, while the second focal point position thereof is coincident with the light receiving surface. In other words, the following relationships hold: L3=L1+L2, L4=L5+L6, and L3=L4+B. Here, the first mirror 160 and the second mirror 200 are disposed in a plane normal to the carriage surface the illuminated object 1.

FIG. 22 illustrates the light shields 18 to be provided on the first lenses 170 and second lenses 190 that are disposed in the casing 202. In FIG. 22, grooves (grooved portions) 202b is provided on the casing 202 side, between the neighboring second lenses 190 disposed in an array. Fitting each of the light shields 18 into the grooves 202a protects light beams from leaking to and entering the neighboring second lenses 190. As is the case with Embodiment 1, the surfaces of the light shields 18 each having a thickness of 0.3 mm, made of a carbon glass material, are sandblasted or etched to provide a rough surfaces. The first lenses 170 and second lenses 190 are separately made of acrylic resin, and coated, except on lens mirror surfaces, with a black shielding substance, and are adhesively fixed directly to the casing 202. Here, detailed operating description of the image sensing apparatus according to Embodiment 2 is omitted because the description of Embodiment 1 applies to Embodiment 2.

From the foregoing description, in the image sensing apparatus in accordance with Embodiment 2 of the present invention, a sensor substrate 201 is provided with the RGB light sources, a vertical light guide 130 is used which extends from the light receiving surface to the proximity of the illumination portion 5, and a multiple of the LED chips 27 are disposed in an array, whereby illuminance in the illuminated portion 5 is significantly increased in comparison with the case of Embodiment 1, and an advantageous effect is achieved in high speed sensing.

It should be noted that in Embodiment 2 the light guide 130 shines light beams from a single side onto the illumination portion 5, however, by adding another light guide on the side of the casing 202 opposite the light guide 130, light beams from both sides may be shone on the illumination portion 5 of the sensing surface.

Embodiment 3

In Embodiment 1 and Embodiment 2, each light source of the RGB signals is illuminated concurrently and then image information are read; in Embodiment 3, a different LED light source is used, as will be described below. Here, detailed operating description of the image sensing apparatus according to Embodiment 3 is omitted because the description of Embodiment 1 applies to Embodiment 3.

FIG. 23 is a schematic diagram illustrating light source portions including the light guide. In FIG. 23A, a light scatter layer 250 uniformly shines the light beams across the entire range in the primary scan direction from the light emitting section 3a of the light guide 3; electrode sections 260 each are disposed separately at either side of the light guide 3; and light sources 270 each include an LED chip that emits a violet light wavelength of 405 nm or more.

In addition, FIG. 23B is partially enlarged view of the neighborhood of the electrode section 260 in FIG. 23A; the light source of the electrode section 260 includes an LED chip array (violet light source) 270, a transparent fluorescent resin 280 that reacts with the violet light source to thereby emit fluorescent light beams, a violet light cut-off filter 290 that suppresses transmission of violent light therethrough, and an electrode 300. As is the case with Embodiment 1, the violet light source 270 is constituted by three LED chips in the either end of the light guide 3. In the figures, like reference numerals as in FIG. 1 indicate like parts or corresponding portions.

Figure 24:
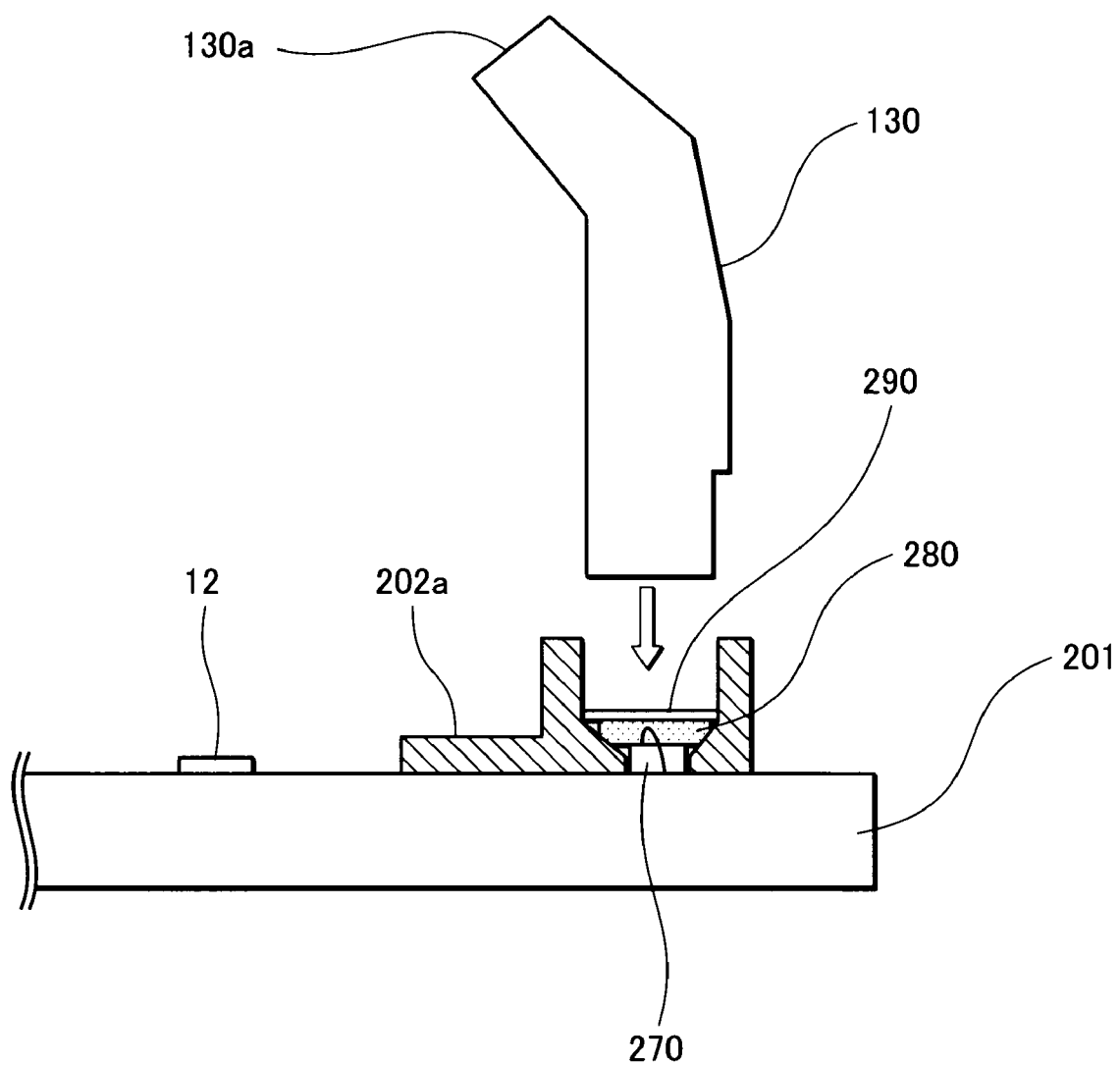
FIG. 24 is a schematic diagram illustrating situations where the different LED light source is used for an image sensing apparatus in accordance with Embodiment 3 of the present invention, and shows situations where a vertical light guide is used.

Furthermore, FIG. 24 illustrates situations where the violet light sources 270 are disposed in an array on the sensor substrate 201, and a light-emitting section 130a is located in the proximity of the illumination portion 5 by providing the vertical light guide 130. In FIG. 24, a holder stand 202a, part of the casing 202, holds the light guide 130, as is the case with Embodiment 2. In the figures, like reference numerals as in FIGS. 18 and 23 indicate like parts or corresponding portions.

FIG. 25 shows relative light outputs against wavelengths of each of fluorescent light beams that are emitted from the fluorescent resin 280 by shining the violet light source 270 on the resin 280. By introducing the violet cut-off filter 290 into a light diffusion area of the violet light source 270, reception of the light having a violet emitting light wavelength range is suppressed at the light receiving portions 21 of the sensor integrated circuit chips 12, while receiving the light having a blue emitting light wavelength range is not greatly suppressed thereat; consequently, light beams containing image information can be received that meet each drop color of the RGB filters added on the sensor integrated circuit chip 12.

Here, in Embodiment 3, the violet color LED is used; however, blue-emitting light has its peak emission output at the optical wavelength in the neighborhood of 475 nm needed for the image information in color representation. Given a light wavelength being below that of the blue-emitting light, an advantageous effect similar to that provided by a violet-emitting LED is achieved by replacing the violet cut-off filter with the low cut filter 290 for wavelength lower than that of the violet light. Such an effect is achieved even by using an ultraviolet-emitting LED.

From the foregoing description, in the image sensing apparatus in accordance with Embodiment 3 of the present invention, since the light source of single wavelength provides a white light by using the fluorescent light beams, color images can be reproduced without using the light source of a plurality of wavelengths, and the RGB filters do not need to adapt to the light source wavelengths, so that various kinds of color filters can be utilized. While the present invention has been shown and described with reference to preferred embodiments thereof, it will be understood by those skilled in the art that various modifications and the like could be made thereto without departing from the spirit and scope of the invention.

What is claimed is:

1. An image sensing apparatus, comprising:
    a light source that shines light on an illumination portion of a document across the entire range in a primary scan direction;
    a first mirror that receives incident light scattered by reflection from the document, to reflect the scattered light in a secondary scan direction;

a plurality of first concaved aspheric mirrors that collimates light beams from the first mirror, to reflect therefrom the collimated light beams as substantially collimated light fluxes;

an aperture mirror that reflects therefrom the light beams from the first aspheric mirrors, through apertures each having a light-shielded portion formed therearound and selectively passing the light beams therethrough;

a plurality of second concaved aspheric mirrors that receives light beams incident from the aperture mirror, to reflect the incident light beams as converging light beams;

a second mirror that reflects the light beams in a direction perpendicular to the surface of the document, disposed on a path of the light beams to be converged by means of the respective second aspheric mirrors;

a plurality of light receivers each having a light-receiving area where the light beams from the second mirrors are incident, and images are thereby formed according to the light beams from the respective apertures; and a casing where at least the first and second aspheric mirrors are disposed on a first side of the casing in the secondary scan direction and the aperture mirror is disposed on a second side thereof in the secondary scan direction.

2. The image sensing apparatus of claim 1, wherein the aperture mirror is located at focal point of the respective first aspheric mirrors.

3. The image sensing apparatus of claim 1, wherein the aperture mirror is located at focal point of the respective second aspheric mirrors.

4. The image sensing apparatus of claim 1, wherein the first aspheric mirrors are integral with the second aspheric mirrors, and the first ones are located to the side of the illumination portion and the second ones to the side of the light receiver.

5. The image sensing apparatus of claim 1, wherein a plurality of light shields that each prevents leak light incident on any one of the second aspheric mirrors arranged in an array from its neighboring mirrors is provided in boundary regions of the mirrors.

6. The image sensing apparatus of claim 5, wherein each of the light shields has an uneven surface.

7. The image sensing apparatus of claim 1, wherein the first and second mirrors are disposed in a plane normal to a carriage plane of an illuminated object.

8. An image sensing apparatus, comprising:
a light source that shines light on an illumination portion of a document across the entire range in a primary scan direction;

a first mirror that receives incident light scattered by reflection from the document, to reflect the scattered light in a secondary scan direction;

a plurality of first concaved aspheric mirrors that collimates the light beams from the first mirror, to reflect therefrom the collimated light beams as substantially collimated light fluxes;

an aperture mirror that reflects therefrom the light beams from the first aspheric mirrors, through apertures each having a light-shielded portion formed therearound and selectively passing the light beams therethrough;

a plurality of second concaved aspheric mirrors that receives the light beams incident from the aperture mirror, to reflect the incident light beams as converging light beams;

a second mirror that reflects the light beams in a direction perpendicular to the surface of the document, disposed on a path of the light beams to be converged by means of the respective second aspheric mirrors; a plurality of light receivers each having a light-receiving area where the light beams from the second mirrors are incident and images are thereby formed according to the light beams from the respective apertures; and a casing where at least the first and second aspheric mirrors are arranged in respective arrays on a first side of the casing in the secondary scan direction, along the primary scan direction and the apertures and the aperture mirror is arranged in respective arrays on a second side thereof in the secondary scan direction, therealong.

9. An image sensing apparatus, comprising:
an RGB light source that shines light on an illumination portion of a document across the entire range in a primary scan direction;

a first mirror that receives incident light scattered by reflection from the document, to reflect the scattered light in a secondary scan direction;

a plurality of first concaved aspheric mirrors that collimates light beams from the first mirror, to reflect therefrom the collimated light beams as substantially collimated light fluxes;

an aperture mirror that reflects therefrom the light beams from the first aspheric mirrors, through apertures each having a light-shielded portion formed therearound and selectively passing the light beams therethrough;

a plurality of second concaved aspheric mirrors that receives light beams incident from the aperture mirror, to reflect the incident light beams as converging light beams;

a second mirror that reflects the light beams in a direction perpendicular to the surface of the document, disposed on a path of the light beams to be converged by means of the respective second aspheric mirrors;

a plurality of light receivers each having RGB filters corresponding to the respective optical wavelengths of the RGB light beams in a light-receiving area where the light beams from the second mirrors are incident and images are thereby formed according to the light beams from the respective apertures; and a casing where at least the first and second aspheric mirrors are disposed on a first side of the casing in the secondary scan direction and the aperture mirror is disposed on a second side thereof in the secondary scan direction.

10. An image sensing apparatus, comprising:
an RGB light source that shines light on an illumination portion of a document across the entire range in a primary scan direction;

a first mirror that receives incident light scattered by reflection from the document, to reflect the scattered light in a secondary scan direction;

a plurality of first concaved aspheric mirrors that collimates light beams from the first mirror, to reflect therefrom the collimated light beams as substantially collimated light fluxes;

an aperture mirror that reflects therefrom the light beams from the first aspheric mirrors, through apertures each having a light-shielded portion formed therearound and selectively passing the light beams therethrough;

a plurality of second concaved aspheric mirrors that receives light beams incident from the aperture mirror, to reflect the incident light beams as converging light beams;

a second mirror that reflects the light beams in a direction perpendicular to the surface of the document, disposed on a path of the light beams to be converged by means of the respective second aspheric mirrors;

a plurality of light receivers each having RGB filters corresponding to the respective optical wavelengths of the RGB light beams in a light-receiving area where the light beams from the second mirrors are incident and images are thereby formed according to the light beams from the respective apertures; and a casing where at least the first and second aspheric mirrors are arranged in respective arrays on a first side of the casing in the secondary scan direction, along the primary scan direction and the apertures and the aperture mirror are arranged in an array on a second side thereof in the secondary scan direction, therealong.

11. The image sensing apparatus of claim 10, wherein a plurality of light shields that each prevents leak light incident on any one of the second aspheric mirrors arranged in an array from its neighboring mirrors is provided in boundary regions of the mirrors.

12. The image sensing apparatus of claim 11, wherein each of the light shields has an uneven surface.

13. An image sensing apparatus, comprising:

a fluorescent light source that shines fluorescent light on an illumination portion of a document across the entire range in a primary scan direction; a first mirror that receives incident light scattered by reflection from the document, to reflect the scattered light in a secondary scan direction; a plurality of first concaved aspheric mirrors that collimates light beams from the first mirror, to reflect therefrom the collimated light beams as substantially collimated light fluxes;

an aperture mirror that reflects therefrom the light beams from the first aspheric mirrors, through apertures each having a light-shielded portion formed therearound and selectively passing the light beams therethrough;

a plurality of second concaved aspheric mirrors that receives the light beams incident from the aperture mirror, to reflect the incident light beams as converging light beams;

a second mirror that reflects the light beams in a direction perpendicular to the surface of the document, disposed on a path of the light beams to be converged by means of the respective second aspheric mirrors;

a plurality of light receivers that includes filters of a plurality of different light colors each having a wavelength longer than that of the blue light, in a light-receiving area where the light beams from the second mirrors are incident and images are thereby formed according to the light beams from the respective apertures;

a casing where at least the first and second aspheric mirrors are disposed on a first side of the casing in the secondary scan direction and the aperture mirror is disposed on a second side thereof in the secondary scan direction; and a low-cut filter that cuts off light of wavelengths shorter than that of blue light, provided in the path of the light passing from the fluorescent light source to the document.

14. An image sensing apparatus, comprising:

a fluorescent light source that shines fluorescent light on an illumination portion of a document across the entire range in a primary scan direction;

a first mirror that receives incident light scattered by reflection from the document, to reflect the scattered light in a secondary scan direction;

a plurality of first concaved aspheric mirrors that collimates light beams from the first mirror, to reflect therefrom the collimated light beams as substantially collimated light fluxes;

an aperture mirror that reflects therefrom the light beams from the first aspheric mirrors, through apertures each having a light-shielded portion formed therearound and selectively passing the light beams therethrough;

a plurality of second concaved aspheric mirrors that receives the light beams incident from the aperture mirror, to reflect the incident the light beams as converging light beams;

a second mirror that reflects the light beams in a direction perpendicular to the surface of the document, disposed on a path of the light beams to be converged by means of the respective second aspheric mirrors;

a plurality of light receivers that includes filters of a plurality of different light colors each having a wavelength longer than that of the blue light, in a light-receiving area where the light beams from the second mirrors are incident, and images are thereby formed according to the light beams from the respective apertures;

a casing where at least the first and second aspheric mirrors are arranged in respective arrays on a first side of the casing in the secondary scan direction, along the primary scan direction and the apertures and the aperture mirror are arranged in respective arrays on a second side thereof in the secondary scan direction, therealong; and a low-cut filter that cuts off light of wavelengths shorter than that of blue light, provided in the path of the light passing from the fluorescent light source to the document.

15. The image sensing apparatus of claim 14, wherein a plurality of light shields that each prevents leak light incident on any one of the second aspheric mirrors arranged in an array from its neighboring mirrors is provided in boundary regions of the mirrors.

16. The image sensing apparatus of claim 15, wherein each of the light shields has an uneven surface.

* * * * *